US012382497B2

(12) United States Patent
Han et al.

(10) Patent No.: US 12,382,497 B2
(45) Date of Patent: Aug. 5, 2025

(54) DEVICE AND METHOD FOR WIRELESS COMMUNICATION USING MULTIPLE LINKS

(71) Applicant: SAMSUNG ELECTRONICS CO., LTD., Suwon-si (KR)

(72) Inventors: Jonghun Han, Suwon-si (KR); Chulho Chung, Suwon-si (KR); Myeongjin Kim, Suwon-si (KR); Eunsung Jeon, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 347 days.

(21) Appl. No.: 17/986,543

(22) Filed: Nov. 14, 2022

(65) Prior Publication Data

US 2023/0156797 A1 May 18, 2023

(30) Foreign Application Priority Data

Nov. 15, 2021 (KR) .................. 10-2021-0157095
May 2, 2022 (KR) .................. 10-2022-0054440

(51) Int. Cl.
*H04W 74/0816* (2024.01)
*H04W 74/08* (2024.01)

(52) U.S. Cl.
CPC ... *H04W 74/0816* (2013.01); *H04W 74/0866* (2013.01)

(58) Field of Classification Search
CPC ......... H04W 74/0816; H04W 74/0866; H04W 76/15; H04W 84/12
See application file for complete search history.

(56) References Cited

U.S. PATENT DOCUMENTS

| 7,715,442 | B2 | 5/2010 | Trainin et al. |
| 10,826,736 | B2 | 11/2020 | Tiirola et al. |
| 2013/0229996 | A1* | 9/2013 | Wang .................. H04L 1/1861 370/329 |

(Continued)

FOREIGN PATENT DOCUMENTS

| EP | 3 893 589 A1 | 10/2021 |
| WO | 2021/206378 A1 | 10/2021 |

OTHER PUBLICATIONS 802.11 Working Group of the LAN/MAN Standards Committee of the IEEE Computer Society, "Draft Standard for Information technology—Telecommunications and information exchange between systems Local and metropolitan area networks—Specific requirements", IEEE P802.11be ™M/D1.0, May 2021, Total 635 pages.

(Continued)

*Primary Examiner* — Kashif Siddiqui
(74) *Attorney, Agent, or Firm* — Sughrue Mion, PLLC

(57) ABSTRACT

A wireless communication method performed by a first device includes entering a transmission preparation period of a first Request To Send (RTS) frame via a first link; obtaining transmission-related information of a second RTS frame via a second link; determining at least one of a first transmission timing and content of the first RTS frame, based on the transmission-related information of the second RTS frame; generating the first RTS frame based on a result of the determining; and transmitting, to a second device via the first link, the generated first RTS frame.

18 Claims, 20 Drawing Sheets

(56) References Cited

U.S. PATENT DOCUMENTS

| | | |
|---|---|---|
| 2016/0119942 A1 | 4/2016 | Wang |
| 2017/0012791 A1* | 1/2017 | Stacey ................. H04L 12/189 |
| 2017/0195991 A1* | 7/2017 | Ahn .................. H04W 74/0833 |
| 2019/0313453 A1 | 10/2019 | Baron et al. |
| 2021/0014811 A1 | 1/2021 | Seok et al. |
| 2021/0105859 A1 | 4/2021 | Hsu et al. |
| 2021/0127420 A1 | 4/2021 | Lu et al. |
| 2021/0136819 A1 | 5/2021 | Seok et al. |
| 2021/0195540 A1 | 6/2021 | Fischer |
| 2021/0211375 A1 | 7/2021 | Kwon et al. |
| 2021/0315025 A1* | 10/2021 | Seok ................. H04W 74/0891 |
| 2023/0156796 A1* | 5/2023 | Han ...................... H04W 76/15 |
| | | 370/329 |

OTHER PUBLICATIONS

Communication dated Feb. 21, 2023, issued by the European Patent Office in European Application No. 22207632.5.

Seok et al., "RTS and CTS Procedure in Synchronous Multi-link Operation," IEEE 802.11-20/0577r0, Apr. 2020, Total 20 pages, XP068172748.

\* cited by examiner

FIG. 11

INFO

| Name |
|---|
| Link Index |
| Link Sensing Required |
| RU Allocation |
| (Reserved) |

DEVICE AND METHOD FOR WIRELESS COMMUNICATION USING MULTIPLE LINKS

CROSS-REFERENCE TO RELATED APPLICATIONS

This application is based on and claims priority under 35 U.S.C. § 119 to Korean Patent Application No. 10-2021-0157095, filed on Nov. 15, 2021, and Korean Patent Application No. 10-2022-0054440, filed on May 2, 2022, in the Korean Intellectual Property Office, the disclosures of which are incorporated by reference herein in their entireties.

BACKGROUND

The present disclosure relates to wireless communication, and more particularly, to a device and method for wireless communication using multiple links.

As an example of wireless communication, a Wireless Local Area Network (WLAN) is technology for connecting two or more apparatuses to each other by using a wireless signal transmission method. The WLAN technology may be based on Institute of Electrical and Electronics Engineers (IEEE) 802.11 standards. For example, the 802.11 standards have developed into 802.11b, 802.11a, 802.11g, 802.11n, 802.11ac, and 802.11ax and may support a transmission rate up to 1 gigabyte per second (GBps), based on Orthogonal Frequency-Division Multiplexing (OFDM) technology.

According to 802.11ac, data may be simultaneously transmitted to multiple users through a multi-user multi-input multi-output (MU-MIMO) technique. According to 802.11ax, which may be referred to as High Efficiency Wireless (HEW), the MU-MIMO technique, as well as, an Orthogonal Frequency-Division Multiple Access (OFDMA) technique may be used, and thus, multiple access may be realized by dividing available subcarriers and providing the divided subcarriers to users. Accordingly, a WLAN system using 802.11ax may effectively support communication in congested areas and outdoor space.

According to 802.11be, which may be referred to as Extremely High Throughput (EHT), a 6-GHz unlicensed spectrum support, bandwidth utilization up to 320 MHz per channel, Hybrid Automatic Repeat and Request (HARM) introduction, support for up to 16×16 MIMO, etc., are planned. To this end, a next-generation WLAN system is expected to effectively support low latency and ultra-high speed transmission like New Radio (NR) used by 5G technology.

SUMMARY

Embodiments of the disclosure provide devices and methods for improving data reliability in wireless communication using multiple links.

According to an aspect of an example embodiment, a wireless communication method performed by a first device, includes: entering a transmission preparation period of a first Request To Send (RTS) frame via a first link; obtaining transmission-related information of a second RTS frame via a second link; determining at least one of a first transmission timing and content of the first RTS frame, based on the transmission-related information of the second RTS frame; generating the first RTS frame based on a result of the determining; and transmitting, to a second device via the first link, the generated first RTS frame.

According to an aspect of an example embodiment, a first device configured to communicate with a second device via a first link and a second link, includes: a radio frequency integrated circuit (RFIC) configured to provide a plurality of access points respectively corresponding to the first link and the second link; and a processor configured to control the plurality of access points, wherein the processor is further configured to: during a transmission preparation period of a first Request To Send (RTS) frame through the first link, obtain transmission-related information of a second RTS frame via the second link; determine at least one of a first transmission timing and content of the first RTS frame, based on the transmission-related information of the second RTS frame; generate the first RTS frame based on a result of the determining; and transmit, to the second device via the first link, the generated first RTS frame.

According to an aspect of an example embodiment, a wireless communication system includes: a plurality of links comprising a first link and a second link; a first device; and a second device configured to communicate with the first device via the plurality of links, wherein the first device is configured to communicate with the second device via the plurality of links, and wherein the first device is further configured to: determine at least one of a transmission timing and content of a first Request To Send (RTS) frame from among a plurality of RTS frames, based on transmission-related information of the plurality of RTS frames via the plurality of links; generate the first RTS frame based on a result of the determining; and transmit, to the second device the generated first RTS frame via the first link.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 11 is a table diagram describing cross-link-related information, according to an embodiment;

DETAILED DESCRIPTION

Figure 1:
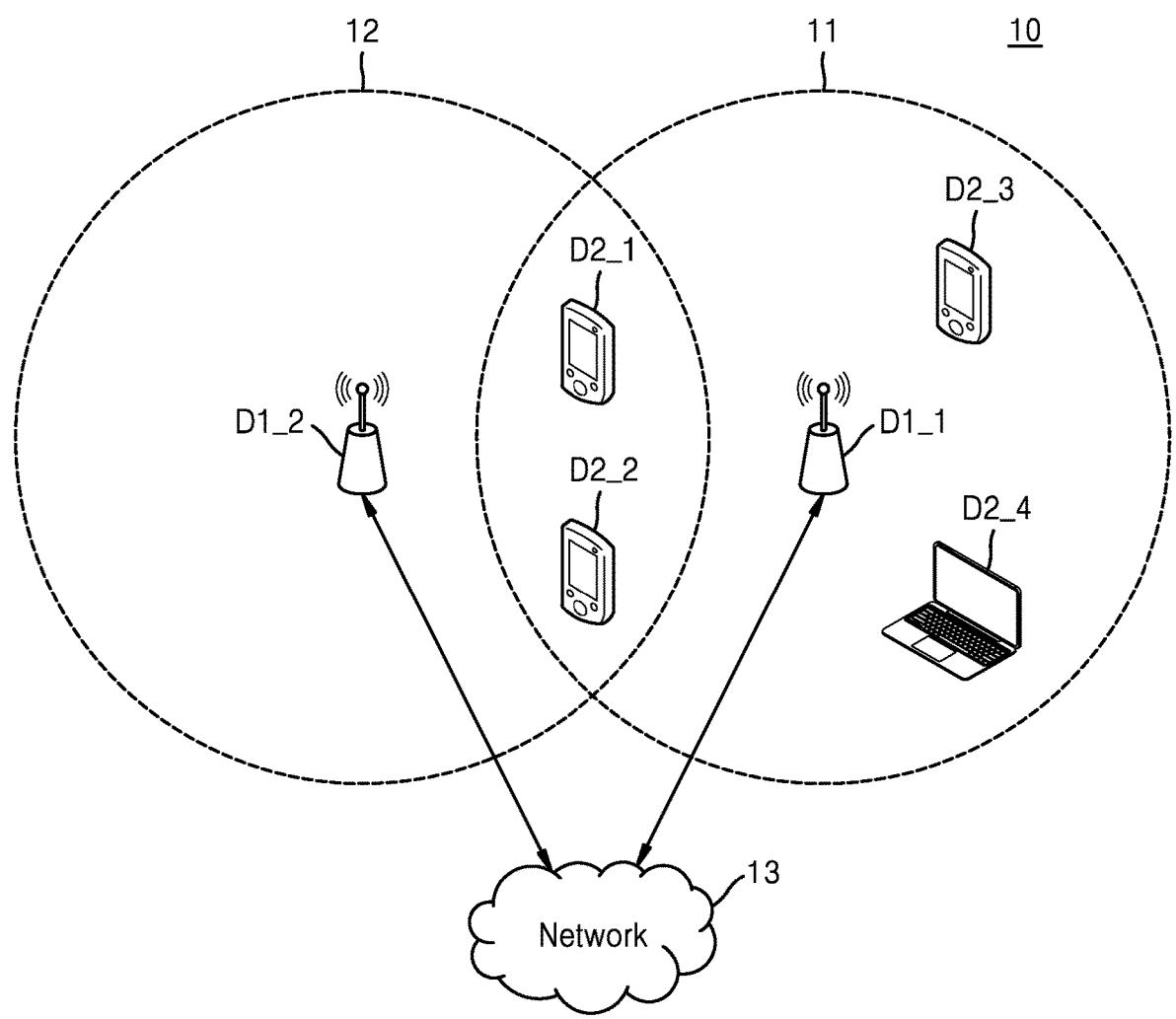
FIG. 1 is a diagram of a wireless communication system, according to an embodiment.

FIG. 1 is a diagram of a wireless communication system 10 according to an embodiment. In detail, FIG. 1 illustrates a Wireless Local Area Network (WLAN) system as an example of the wireless communication system 10.

Hereinafter, one or more embodiments of the disclosure are described based on an Orthogonal Frequency-Division Multiplexing (OFDM) or Orthogonal Frequency-Division Multiple Access (OFDMA)-based wireless communication system, in particular, IEEE 802.11 standards. The disclosure may also be applicable, with minor modifications, to other communication systems (e.g., a cellular communication system, such as Long Term Evolution (LTE), LTE-advanced (LTE-A), New Radio (NR), Wireless Broadband (WiBro), or Global System for Mobile Communication (GSM), or a short-range communication system, such as Bluetooth or Near Field Communication (NFC)), which have similar technical backgrounds and channel forms to those of the disclosure without significantly departing from the scope of the disclosure.

Also, various functions described below may be embodied or supported according to Artificial Intelligence (AI) technology and/or one or more computer programs, and each of the one or more computer programs is implemented as computer-readable program code and executed in a computer-readable medium. The terms "application" and "program" indicate one or more computer programs, software components, a set of instructions, procedures, functions, objects, classes, instances, relevant data, or some of the applications and programs appropriate to realize computer-readable program code. The expression "computer-readable program code" includes all types of computer code including source code, object code, and execution code. The expression "computer-readable medium" includes all types of media, for example, Read Only Memory (ROM), Random Access Memory (RAM), a hard disk drive, compact disks (CDs), digital video disks (DVDs), or other types of memory, which are accessible by a computer. A "non-transitory" computer-readable recording medium excludes wired, wireless, optical, or other communication links used to transmit transitory electrical or other signals. Examples of the non-transitory computer-readable recording medium include a medium in which data may be permanently stored, and a medium, for example, a rewriteable optical disk or a removable memory device, in which data may be stored and overwritten later.

In one or more embodiments described below, a hardware approach method is described. However, various embodiments include technology using both hardware and software, and thus, the embodiments of the disclosure do not exclude a software-based approach method.

Referring to FIG. 1, the wireless communication system 10 may include first device D1_1, second device D1_2, third device D2_1, fourth device D2_2, fifth device D2_3, and sixth device D2_4. The first device D1_1 and the second device D1_2 may access a network 13 that may include the Internet, an Internet protocol (IP) network, or another arbitrary network. The first device D1_1 may access the network 13 in a first coverage area 11. The first device D1_1 may provide access to the network 13 to devices that are within the first coverage area 11 (e.g., the third device D2_1, the fourth device D2_2, the fifth device D2_3, and the sixth device D2_4), and the second device D1_2 may provide access to the network 13 to devices that are within a second coverage area 12 (e.g., the third device D2_1 and the fourth device D2_2).

In some embodiments, based on Wireless Fidelity (Wi-Fi, e.g., 802.11) or other arbitrary WLAN access technology, the first device D1_1 and the second device D1_2 may communicate with at least one of the third to sixth devices (e.g., D2_1, D2_2, D2_3, D2_4) by using multiple links. The first device D1_1 and the second device D1_2 may each correspond to an access point multiplelinks device (which may also be referred to as an access point multiple-links device) (AP MLD), and the third to sixth devices (e.g., D2_1, D2_2, D2_3, D2_4) may each correspond to a non-AP MLD. In the disclosure, an AP MLD may refer to a device capable of supporting access points (APs), and a non-AP MLD may refer to a device capable of supporting stations (STAs).

In some embodiments, the first device D1_1 and the second device D1_2 may each be referred to as a router, a gateway, or the like, and the third to sixth devices (e.g., D2_1, D2_2, D2_3, D2_4) may each be referred to as a terminal, a mobile terminal, a wireless terminal, user equipment, or the like. Also, the third to sixth devices (e.g., D2_1, D2_2, D2_3, D2_4) may each be a mobile device, such as, but not limited to, a mobile phone, a laptop computer, or a wearable device, or a stationary device, such as, but not limited to, a desktop computer or a smart television (TV).

The AP MLD may assign at least one resource unit (RU) to at least one non-AP MLD. The AP MLD may transmit data to the non-AP MLD by using the assigned at least one RU, and the non-AP MLD may receive the data from the AP MLD by using the assigned at least one RU. According to 802.11be (hereinafter, referred to as EHT) or next-generation IEEE 802.11 standards (hereinafter, referred to as EHT+), an AP MLD may assign a multi-resource unit (MRU) including two or more RUs to at least one non-AP MLD. For example, the first device D1_1 may assign an MRU to at least one of the third to sixth devices (e.g., D2_1, D2_2, D2_3, D2_4) and may transmit data thereto by using the assigned MRU.

In some embodiments, in performing communication using multiple links by the AP MLD and the non-AP MLD, a protection mechanism for securing the reliability of data communication may be selectively activated in their respective links. For example, in the communication between the AP MLD and the non-AP MLD, the protection mechanism may be activated in communication using a first link and may be deactivated in communication using a second link. The AP MLD may adaptively control at least one of a transmission timing and content of arbitrary frame so as to effectively perform signaling with the non-AP MLD, the signaling being defined in the protection mechanism. In some embodiments, the non-AP MLD may also adaptively control at least one of a transmission timing and content of arbitrary frame so as to effectively perform signaling with the AP MLD, the signaling being defined in the protection mechanism. Hereinafter, for convenience of explanation, an operation of the AP MLD is mainly described, but this is merely an example. That is, one or more embodiments are not limited thereto, and embodiments may be applied to a non-AP MLD.

Hereinafter, embodiments are described referring to an EHT, but it is to be understood that embodiments may be applied to other protocol standards (e.g., EHT+) without deviating from the scope of the disclosure.

Figure 2:
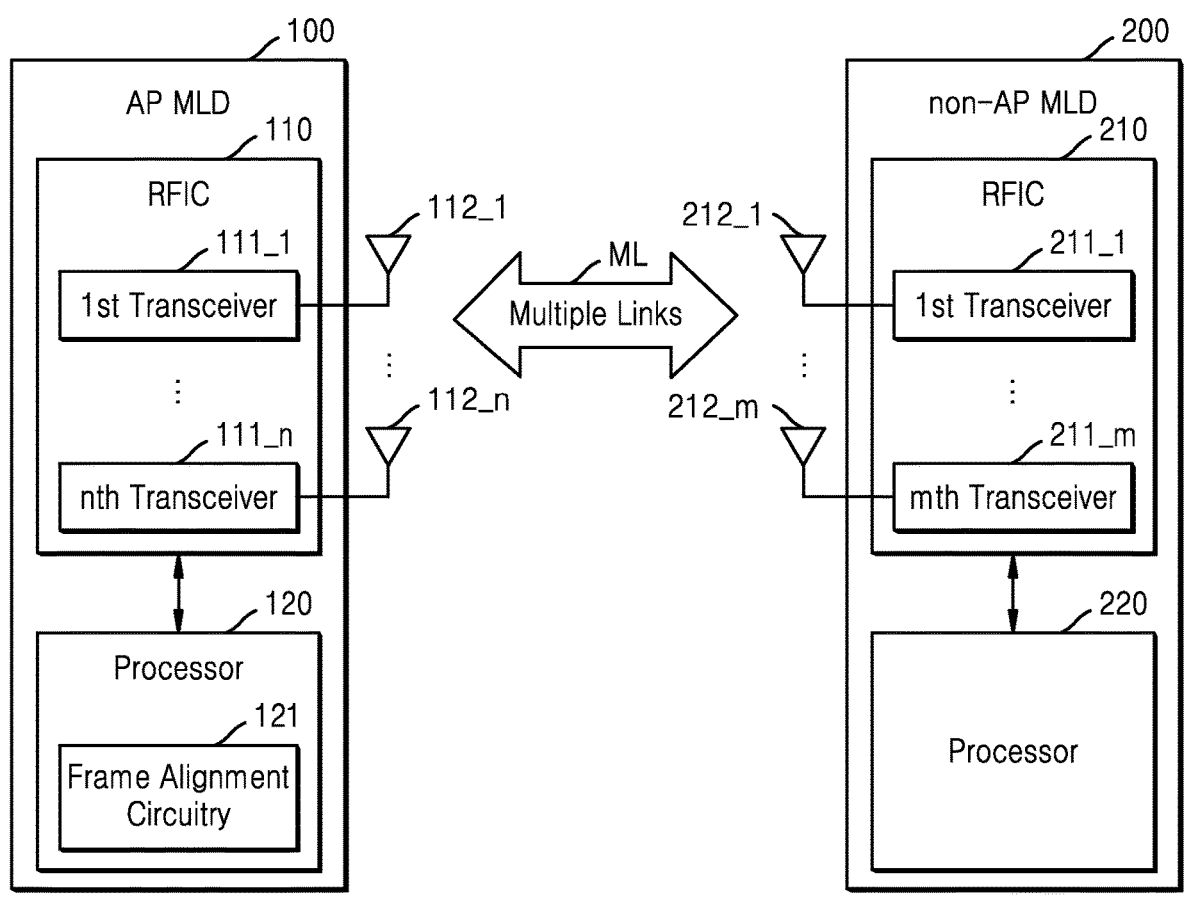
FIG. 2 is a block diagram of a wireless communication system, according to an embodiment.

FIG. 2 is a block diagram of a wireless communication system 20 according to an embodiment. In detail, the block diagram of FIG. 2 illustrates an AP MLD 100 and a non-AP MLD 200 that communicate with each other in the wireless communication system 20. Each of the AP MLD 100 and the non-AP MLD 200 of FIG. 2 may be an arbitrary device working in the wireless communication system 20 and may be referred to a device for wireless communication or simply as a device.

Referring to FIG. 2, the AP MLD 100 may include a Radio Frequency Integrated Circuit (RFIC) 110 and a processor 120. The RFIC 110 may include first to $n^{th}$ transceivers 111_1 to 111_n (hereinafter, "111" generally) and first to $n^{th}$ antennas 112_1 to 112_n (hereinafter, "112" generally), where n is an integer greater than 1. The RFIC 110 and the processor 120 may be included in one package or different packages, respectively. The non-AP MLD 200 may include an RFIC 210 and a processor 220. The RFIC 210 may include first to $m^{th}$ transceivers 211_1 to 211_m (hereinafter, "211" generally) and first to $m^{th}$ antennas 212_1 to 212_m (hereinafter, "212" generally), where m is an integer greater than 1. Hereinafter, descriptions regarding the non-AP MLD 200 that are the same as the descriptions regarding the AP MLD 100 are omitted.

The antennas 112 may be respectively coupled to the transceivers 111 and may provide signals from the non-AP MLD 200 to the transceivers 111 or transmit signals from the transceivers 111 to the non-AP MLD 200. In some embodiments, the antennas 112 may include a phased array for beam forming.

The transceivers 111 may process signals transmitted from the non-AP MLD 200 through the antennas 112 and may provide the processed signals to the processor 120. Also, the transceivers 111 may process signals provided from the processor 120 and output the processed signals through the antennas 112. In some embodiments, the transceivers 111 may include analog circuits, such as, but not limited to, a low noise amplifier, a mixer, a filter, a power amplifier, an oscillator, or the like. The transceivers 111 may process signals from the antennas 112 and/or the processor 120 under control by the processor 120.

In an embodiment, the AP MLD 100 may perform ML-based communication with the non-AP MLD 200 by using the transceivers 111 and the antennas 112. Frequency bands, to which multiple links ML are respectively assigned, may be different from one another, and the AP MLD 100 may support n APs through a control operation of the processor 120 that utilizes the transceivers 111 and the antennas 112. For example, the AP MLD 100 may support a first AP including the first transceiver 111_1 and the first antenna 112_1 and controlled by the processor 120 and a second AP including the second transceiver 111_2 and the second antenna 112_2 and controlled by the processor 120.

In some embodiments, the AP MLD 100 may further include first individual processors respectively corresponding to n APs, and the processor 120 may control the first individual processors so that the n APs may respectively perform operations according to embodiments. For example, the AP MLD 100 may support a first AP including a first individual processor, the first transceiver 111_1, and the first antenna 112_1 and a second AP including a second individual processor, the second transceiver 111_2, and the second antenna 112_2.

The processor 120 may extract information by demodulating and/or decoding signals that are transmitted from the non-AP MLD 200 by processing the signals from the transceivers 111. Also, the processor 120 may generate signals including information to be transmitted to the non-AP MLD 200 and may provide the generated signals to the transceivers 111. For example, the processor 120 may provide the transceivers 111 with signals generated by coding and/or modulating data to be transmitted to the non-AP MLD 200. In some embodiments, the processor 120 may include a programmable component, such as a central processing unit (CPU) or a digital signal processor (DSP), a reconfigurable component, such as a field programmable gate array (FPGA), or a component, e.g., an intellectual property (IP) core, which provides a fixed function. In some embodiments, the processor 120 may include a memory, in which data and/or a series of instructions are stored, or may access the memory.

In an embodiment, the non-AP MLD 200 may perform the ML-based communication with the AP MLD 100 by using the transceivers 211 and the antennas 212. The non-AP MLD 200 may support m STAs through a control operation of the processor 220 that utilizes the transceivers 211 and the antennas 212. For example, the non-AP MLD 200 may support a first STA including the first transceiver 211_1 and the first antenna 212_1 and controlled by the processor 220 and a second STA including the second transceiver 211_2 and the second antenna 212_2 and controlled by the processor 220. In some embodiments, the number of STAs supported by the non-AP MLD 200 may be less than or equal to the number of AP MLDs 100, and the number of links ML may correspond to the number of STAs supported by the non-AP MLD 200.

In some embodiments, the non-AP MLD 200 may further include second individual processors respectively corresponding to m STAs, and the processor 220 may control the second individual processors so that the m STAs may respectively perform operations according to embodiments. For example, the non-AP MLD 200 may support a first STA including a first individual processor, the first transceiver 211_1, and the first antenna 212_1, and a second STA including a second individual processor, the second transceiver 211_2, and the second antenna 212_2.

In an embodiment, the processor 120 may include frame alignment circuitry 121. The frame alignment circuitry 121 may adaptively control at least one of a timing and content of an arbitrary frame so as to effectively perform signaling of a protection mechanism for securing the reliability of communication using multiple links ML, the communication being performed between the AP MLD 100 and the non-AP MLD 200. In detail, the AP MLD 100 and the non-AP MLD 200 may mutually transmit/receive a Request To Send (RTS) frame and a Clear To Send (CTS) frame according to the protection mechanism and may mutually transmit/receive data according to a transmission/reception result. In this case, the frame alignment circuitry 121 may determine at least one of a transmission timing and content of an RTS frame to enable the AL MLD 100 to receive mutually aligned CTS frames from the non-AP MLD 200 through at least two of the multiple links ML, and may generate an RTS frame based on a result of the determination, thereby transmitting the generated RTS frame to the non-AP MLD 200 through the RFIC 110.

In some embodiments, the processor 220 of the non-AP MLD 200 may also include frame alignment circuitry configured to perform a similar or identical operation to the frame alignment circuitry 121 of the AP MLD 100.

Figure 3:
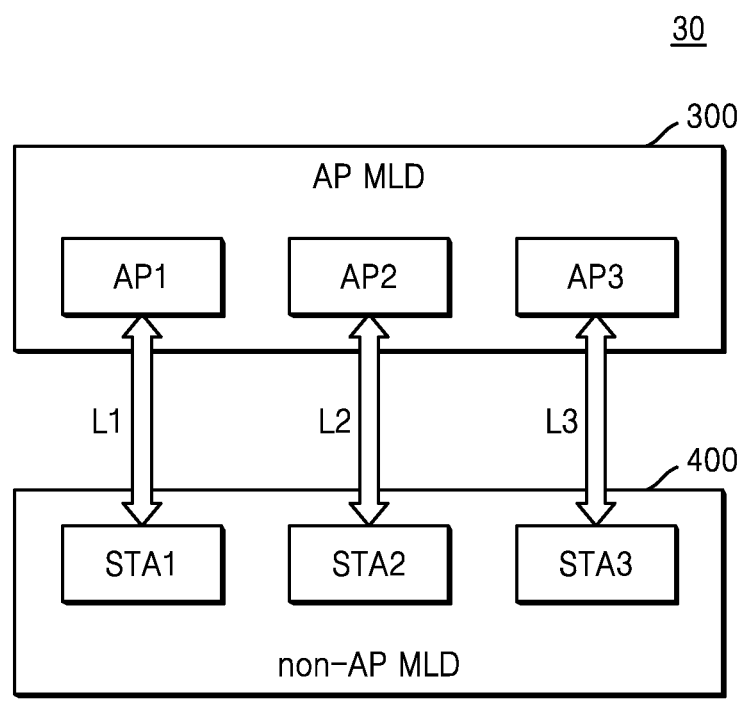
FIG. 3 is a block diagram of a wireless communication system, according to an embodiment.

FIG. 3 is a block diagram of a wireless communication system 30 according to an embodiment. In detail, the block diagram of FIG. 3 illustrates an AP MLD 300 and a non-AP MLD 400 that communicate with each other by using first to third links L1 to L3 in the wireless communication system 30. The AP MLD 300 may include or may be similar in many respects to at least one of the AP MLD 100 described in reference to FIG. 2 and the first device D1_1 and the second device D1_2 described in reference to FIG. 1, and may include additional features not mentioned above. The non-AP MLD 400 may include or may be similar in many respects to at least one of the non-AP MLD 200 described in reference to FIG. 2 and the third to sixth devices (e.g., D2_1, D2_2, D2_3, D2_4) described in reference to FIG. 1, and may include additional features not mentioned above.

In an embodiment, the AP MLD 300 may include a first access point AP1, a second access point AP2, and a third access point AP3, and the non-AP MLD 400 may include a first station STA1, a second station STA2, and a third station STA3. In some embodiments, unlike the illustration of FIG. 3, the AP MLD 300 and the non-AP MLD 400 may communicate with each other by using three or more links and may respectively include APs and STAs of which the number corresponds to the number of links.

In some embodiments, the first access point AP1 may setup a first link L1 with first station STA1, the second access point AP2 may setup a second link L2 with second station STA2, and the third access point AP3 may setup a third link L3 with third station STA3. However, the disclosure is not limited in this regard. That is, the access points AP1-AP3 may setup any number of links with any of the stations STA1-STA3.

For example, the AP MLD 300 and the non-AP MLD 400 may perform an access process and/or a negotiation process for a multiple-links operation. The non-AP MLD 400 may identify a frequency band usable in the communication with the AP MLD 300 and may negotiate with the AP MLD 300 to use two or more of the links, which are supported by the AP MLD 300, for the multiple links. As described above, a method whereby two or more links are used for mutual communication may be referred to as a multiple-links operation (MLO). According to the MLO, the wireless communication system 30 may provide a high throughput.

Figure 4A:
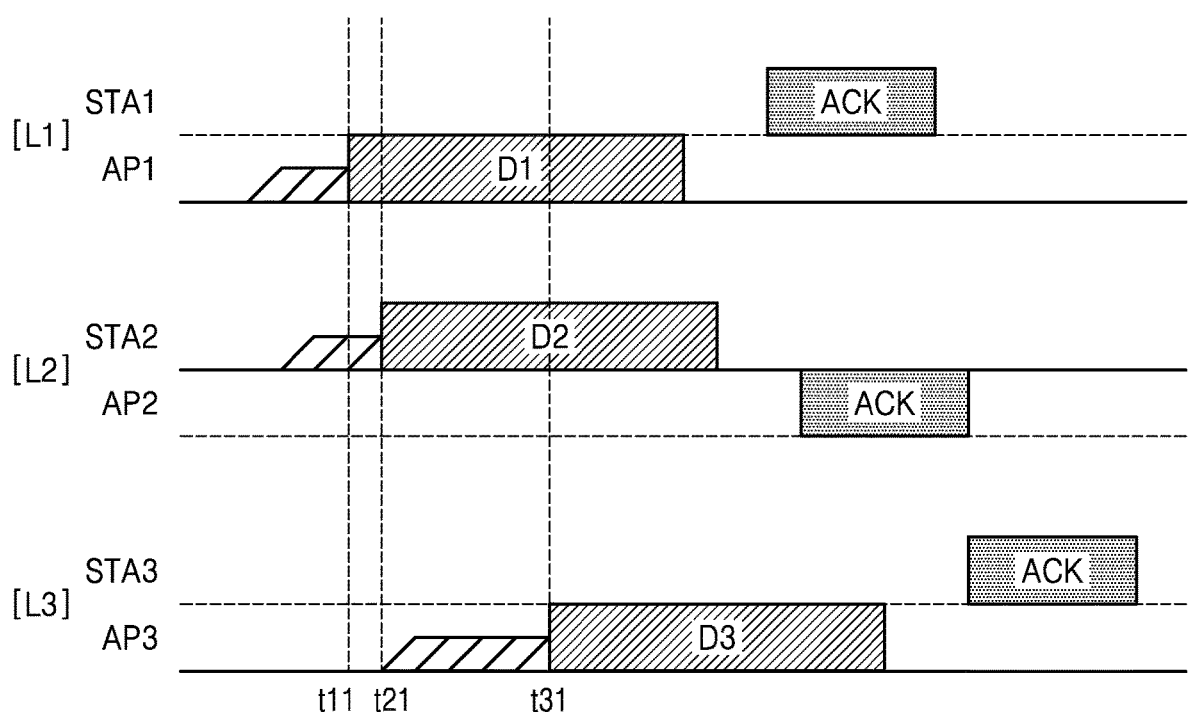
FIGS. 4A and 4B are timing diagrams of an example of a multiple-links operation, according to an embodiment.
Figure 4B:
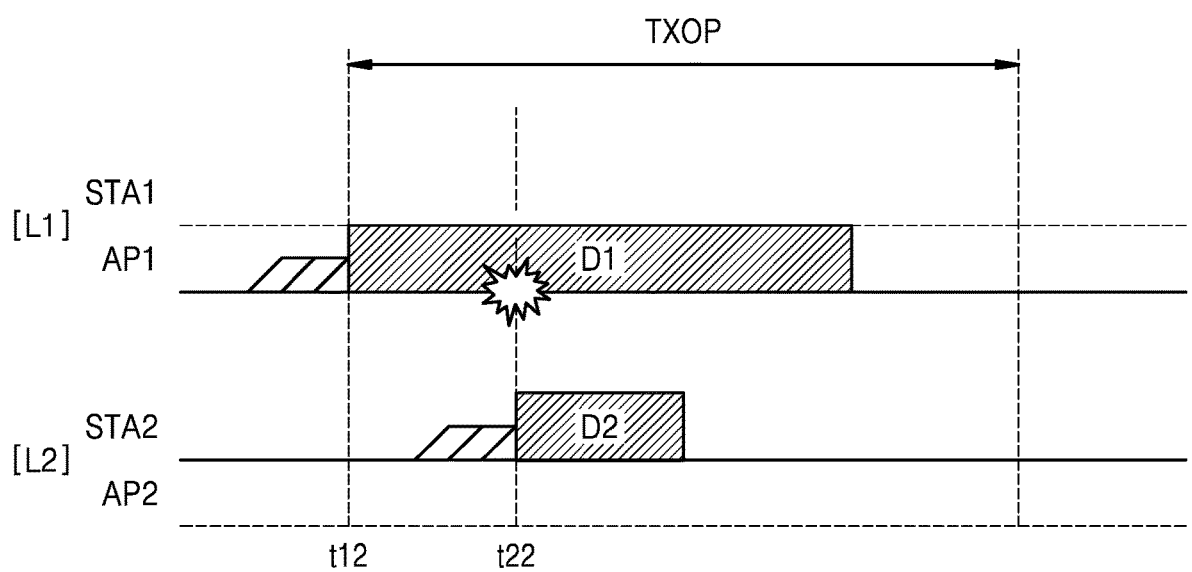

FIGS. 4A and 4B are timing diagrams of an example of an MLO. In detail, FIGS. 4A and 4B illustrate examples of an MLO performed by the wireless communication system 20 of FIG. 2 and/or the wireless communication system 30 of FIG. 3. Hereinafter, descriptions regarding FIGS. 4A and 4B are provided with reference to FIG. 3.

The AP MLD 300 and the non-AP MLD 400 of FIG. 3 may support Simultaneous Transmit And Receive (STR). For example, the AP MLD 300 may receive data from the non-AP MLD 400 through the second link L2 while transmitting the data to the non-AP MLD 400 through the first link L1 at the same time. The first to third APs AP1 to AP3 may have different Medium Access Control (MAC) addresses and manage the first to third links L1 to L3, respectively. Accordingly, each of the first to third APs AP1 to AP3 may function as an independent AP. Also, the first to third STAs STA1 to STA3 may have different MAC addresses and function as independent STAs, respectively. The AP MLD 300 and the non-AP MLD 400 may mutually communicate in a multi-band. For example, the first link L1 may use a bandwidth (e.g., 40 MHz) in a 2.4 GHz band, the second link L2 may use a bandwidth (e.g., 160 MHz) in a 5 GHz band, and the third link L3 may use a bandwidth (e.g., 160 MHz) in a 6 GHz band.

Referring to FIG. 4A, at time t1, the first AP AP1 may start transmitting first data D1 on the first link L1, and the first STA STA1 may receive the first data D1. While the first AP AP1 transmits the first data D1 to the first STA STA1, the second STA STA2 may start transmitting second data D2 on the second link L2 to the second AP AP2, and the second AP AP2 may receive the second data D2 from the second STA STA2 at time t21. Although the transmission of the first data D1 overlaps the transmission of the second data D2 in a time domain, the first STA STA1 and the second AP AP2 may respectively receive the first data D1 and the second data D2 from the first AP AP1 and the second STA STA2, according to the STR. Also, while the first AP AP1 transmits the first data D1 to the first STA STA1 and the second STA STA2 transmits the second data D2 to the second AP AP2, the third AP AP3 may start transmitting third data D3 on the third link L3 to the third STA STA3, and the third STA STA3 may receive the third data D3 from the third AP AP3, at time t31. Although the transmission of the first data D1, the transmission of the second data D2, and the transmission of the third data D3 overlap each other in the time domain, the first STA STA1, the second AP AP2, and the third STA STA3 may respectively receive the first data D1, the second data D2, and the third data D3 according to the STR.

In addition, there may be links in which the STR is difficult to be performed in the MLO. For example, when frequency bands of links are not sufficiently spaced, interference may occur between the links, and thus, the links may be links on which the STR may be difficult to be performed. Also, when interference occurs between links because of various reasons including a structural limitation resulting from the weight and size reduction of hardware in the non-AP MLD, it may be difficult to perform the STR on the above links. As described, the links in the MLO may include a non-STR link group including the links on which the STR may be difficult to be performed, and in particular, two links, on which the STR is difficult to be performed because of mutual interference in the non-STR link group, may be referred to as a non-STR link pair. The non-STR link group may be identified while the AP MLD 300 and the non-AP MLD 400 set up the first to third links L1 to L3.

Referring to FIG. 4B, it is assumed that the first link L1 and the second link L2 form a non-STR link pair. For example, the first link L1 may use a 6 GHz band, and the second link L2 may use a 5 GHz band. At time t12, the first AP AP1 may obtain a transmit opportunity (TXOP) and start transmitting the first data D1 on the first link L1 to the first STA STA1, and the first STA STA1 may receive the first data D1 from the first AP AP1. At time t22, the second STA STA2 may start transmitting the second data D2 on the second link L2, but when the first link L1 and the second link L2 are the non-STR link pair, the interference may occur between the transmission of the second data D2 and the reception of the first data D1 in the non-AP MLD 400. For example, the first data D1 is leaked in the second STA STA2 through a path in which the second data D2 is transmitted to the second AP AP2, and the second data D2 may not be appropriately transmitted to the second AP AP2 through the second link L2. The above interference may be caused during the signaling of the protection mechanism between the AP MLD 300 and the non-AP MLD 400, as described below with reference to FIG. 5. It is assumed that the first link L1 and the second link L2 described with reference to the drawings below are a non-STR link pair.

Figure 5:
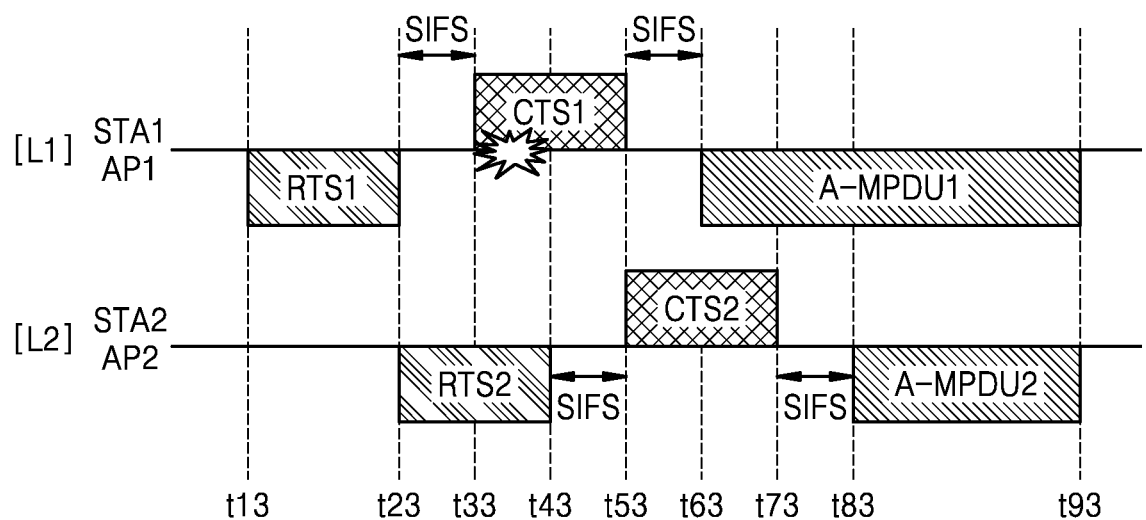
FIG. 5 is a timing diagram including signaling according to a protection mechanism in a multiple-links operation, according to an embodiment.

FIG. 5 is a timing diagram including signaling based on the protection mechanism in an MLO. In detail, FIG. 5 illustrates an example of the MLO performed by the wireless communication system 20 of FIG. 2 and/or the wireless communication system 30 of FIG. 3. Hereinafter, the description regarding FIG. 5 is provided with reference to FIG. 3, and it is assumed that the protection mechanism is activated in the first and second links L1 and L2.

Referring to FIG. 5, at time t13, the first AP AP1 may start transmitting the first RTS frame RTS1 through the first link L1, and the first STA STA1 may receive the first RTS frame RTS1. At time t33, after a Short Interframe Space (SIFS) from a time t23, the first STA STA1 may start transmitting the first CTS frame CTS1 through the first link L1 in response to the first RTS frame RTS1, and the first AP AP1 may receive the first CTS frame CTS1. At time t63, after SIFS from a time t53, the first AP AP1 may start transmitting a first aggregated-MAC protocol data unit (A-MPDU) A-MPDU1 through the first link L1 in response to the first CTS CTS1, and the first STA STA1 may receive the first A-MPDU A-MPDU1.

In the time t23, the second AP AP2 may start transmitting a second RTS frame RTS2 through the second link L2, and the second STA STA2 may receive the second RTS frame RTS2. In the time t53, after SIFS from the time t43, the second STA STA2 may start transmitting the second CTS frame CTS2 through the second link L2 in response to the second RTS frame RTS2, and the second AP AP2 may receive the second CTS frame CTS2. At time t83, after the SIFS from a time t73, the second AP AP2 may start transmitting a second A-MPDU A-MPDU2 through the second link L2 in response to the second CTS frame CTS2, and the second STA STA2 may receive the second A-MPDU A-MPDU2. The AP MLD 300 may control an end of the first A-MPDU A-MPDU1 to be aligned with an end of the second A-MPDU A-MPDU2 at time t93.

Because the first link L1 and the second link L2 form the non-STR link pair in the time t33 to the time t43, the interference may occur between the transmission of the first CTS frame CTS1 and the reception of the second RTS frame RTS2 in the non-AP MLD 400. Because of the above interference, the signaling of the protection mechanism may not be smoothly performed, which may negatively affect the reliability of the data communication.

The AP MLD 300 may determine at least one of the transmission timing and the content of the first RTS frame RTS1 and avoid the interference between the reception of the second RTS frame RTS2 and the transmission of the first CTS frame CTS1 in the non-AP MLD 400. That is, the AP MLD 300 may generate the first RTS frame RTS1 to align the first CTS frame CTS1 with the second CTS frame CTS2, thus transmitting the generated first RTS frame RTS1 to the non-AP MLD 400 through the first link L1. A method whereby the AP MLD 300 generates the first RTS frame RTS1 may vary, and examples of the method are described with reference to FIGS. 6A to 13B. Hereinafter, various embodiments are independently described, but they are merely examples. It would be understood that various embodiments may be applied in combination according to the idea of the disclosure.

Figure 6A:
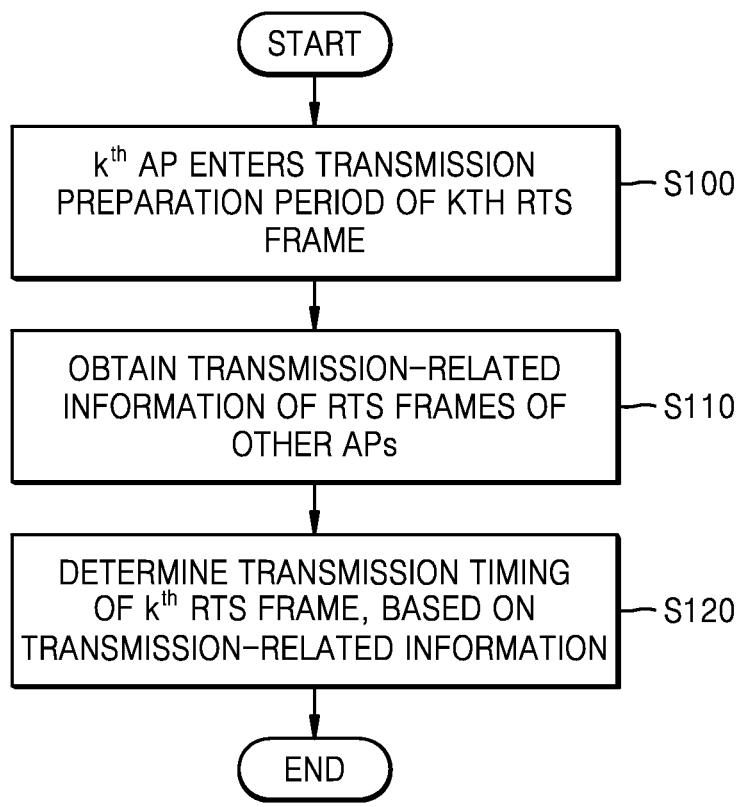
FIGS. 6A and 6B are flowcharts of an operation method of an access point multiple-links device (AP MLD), according to an embodiment.
Figure 6B:
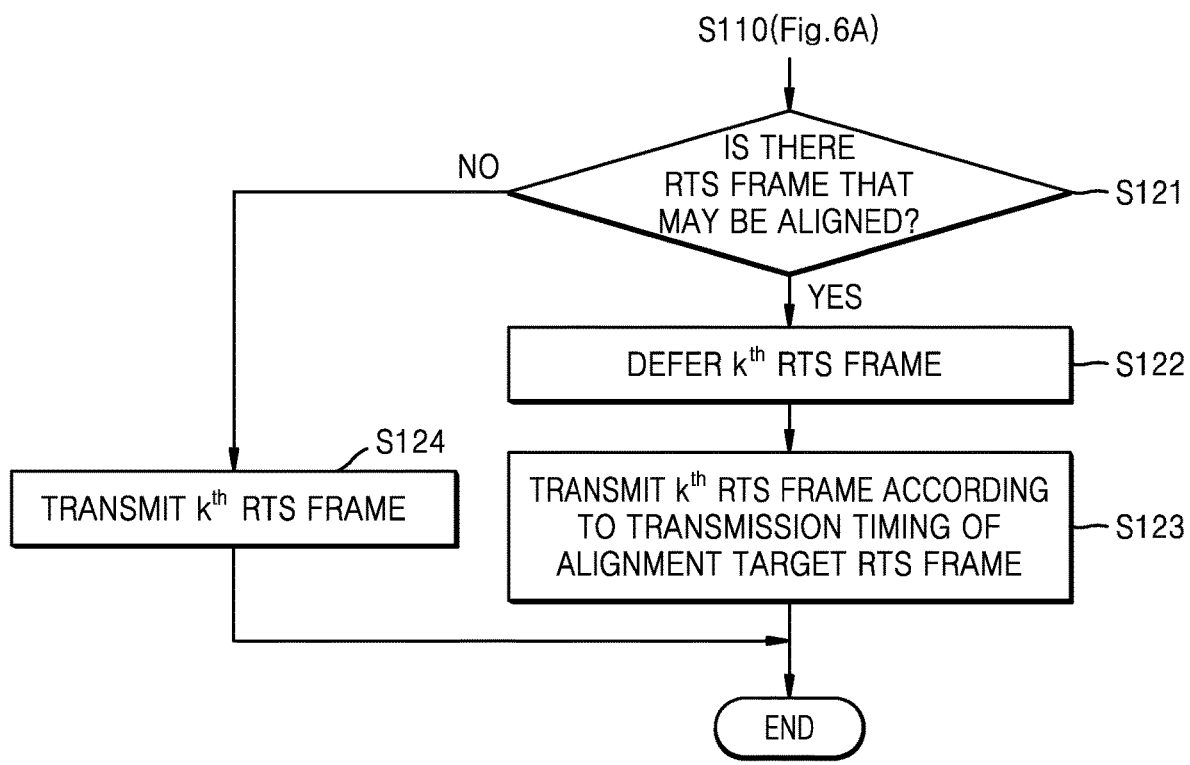

FIGS. 6A and 6B are flowcharts of an operation method of an AP MLD (e.g., AP MLD 100 of FIG. 2, AP MLD 300 of FIG. 3), according to an embodiment. It is assumed that a $k^{th}$ AP and other APs are included in the AP MLD.

Referring to FIG. 6A, in operation S100, the $k^{th}$ AP may enter a transmission preparation period of a $k^{th}$ RTS frame, where k is an integer equal to or greater than 1. In the disclosure, an operation of a certain AP may be understood as an operation of the AP MLD. Also, in the disclosure, a transmission preparation period of an RTS frame may refer to a period in which a transmission timing and content of the RTS frame are determined and may be set before the transmission timing of the RTS frame has occurred. The transmission preparation period of the RTS frame is temporarily named for the understanding of embodiments, and thus, one or more embodiments are not limited thereto. Also, in some embodiments, the AP MLD may not separately include a transmission preparation period of an RTS frame and may perform, in an arbitrary period, an operation of generating an RTS frame according to an embodiment. For example, the entry to the transmission preparation period of the RTS frame may be made in response to the a back-off count for the transmission of the RTS frame of the AP reaching a reference value. For example, when the back-off count of the AP gradually decreases from a certain value and reaches a reference value, the AP may enter the transmission preparation period of the RTS frame. Also, in some embodiments, the transmission preparation period of the RTS frame may include a space in which the transmission of the RTS frame is waited for.

In operation S110, the $k^{th}$ AP may obtain information regarding transmissions of RTS frames of other APs except for the $k^{th}$ AP. It may be limited that other APs respectively correspond to links having a non-STR link pair relationship with a $k^{th}$ link corresponding to the $k^{th}$ AP. In an embodiment, the information regarding the transmissions of the RTS frames of other APs may include whether the protection mechanism is activated in links respectively corresponding to the other APs and back-off counts of other APs for the transmission of the RTS frame. In a transmission preparation period of a $k^{th}$ RTS frame, the $k^{th}$ AP may check in advance other APs capable of transmitting the RTS frames and an RTS frame having a transmission timing close to a transmitting timing of the $k^{th}$ frame, based on the information regarding the transmissions of the RTS frames.

In operation S120, the $k^{th}$ AP may determine the transmission timing of the $k^{th}$ RTS frame, based on the information obtained in operation S110. In an embodiment, the $k^{th}$ AP may delay the transmission timing of the $k^{th}$ RTS frame to make the transmission timing of the $k^{th}$ RTS frame correspond to the transmission timing of the RTS frame of another AP. To this end, the $k^{th}$ AP may transmit the $k^{th}$ RTS frame at the same timing as the transmission timing of the RTS frame of another AP.

FIG. 6B is a flowchart illustrating in detail operation S120 of FIG. 6A. Referring further to FIG. 6B, in operation S121 after operation S110 (FIG. 6A), the $k^{th}$ AP may identify whether there is an RTS frame that may be aligned with the $k^{th}$ RTS frame. In this case, the RTS frame that may be aligned with the $k^{th}$ RTS frame may indicate an RTS frame scheduled to be transmitted to have a start and an end that may be respectively aligned with a start and an end of the $k^{th}$ RTS frame. In an embodiment, the $k^{th}$ AP may identify an RTS frame of another AP having a transmission timing close to a transmission timing of the $k^{th}$ RTS frame. In an embodiment, whether the transmission timing of the RTS frame is close to that of the $k^{th}$ RTS frame may be identified based on whether a difference between back-off counts of other APs for the transmission of the RTS frame and a back-off count of the $k^{th}$ AP is included in a reference difference.

When a result from S121 is 'YES,' operation S122 may be subsequently performed, and the $k^{th}$ AP may defer the transmission of the $k^{th}$ RTS frame of the $k^{th}$ AP.

In operation S123, the $k^{th}$ AP may end the transmission preparation period of the $k^{th}$ RTS frame stated in operation S100 and transmit the $k^{th}$ RTS frame at a transmission timing of an alignment target RTS frame of the other AP that is identified in operation S121. In some embodiments, in operation S121, it may be identified that there are a plurality of RTS frames that may be aligned with the $k^{th}$ RTS frame, and in this case, APs including the $k^{th}$ AP may defer the transmission of the $k^{th}$ RTS frame and the RTS frames, which may be aligned with the $k^{th}$ RTS frame, according to a transmission timing of an RTS frame that is the latest among transmission timings of the RTS frames.

When a result from operation S121 is 'NO,' operation S124 may be subsequently performed, and the $k^{th}$ AP may end the transmission preparation period of the $k^{th}$ RTS frame in operation S100 and immediately transmit the $k^{th}$ RTS frame.

Figure 7:
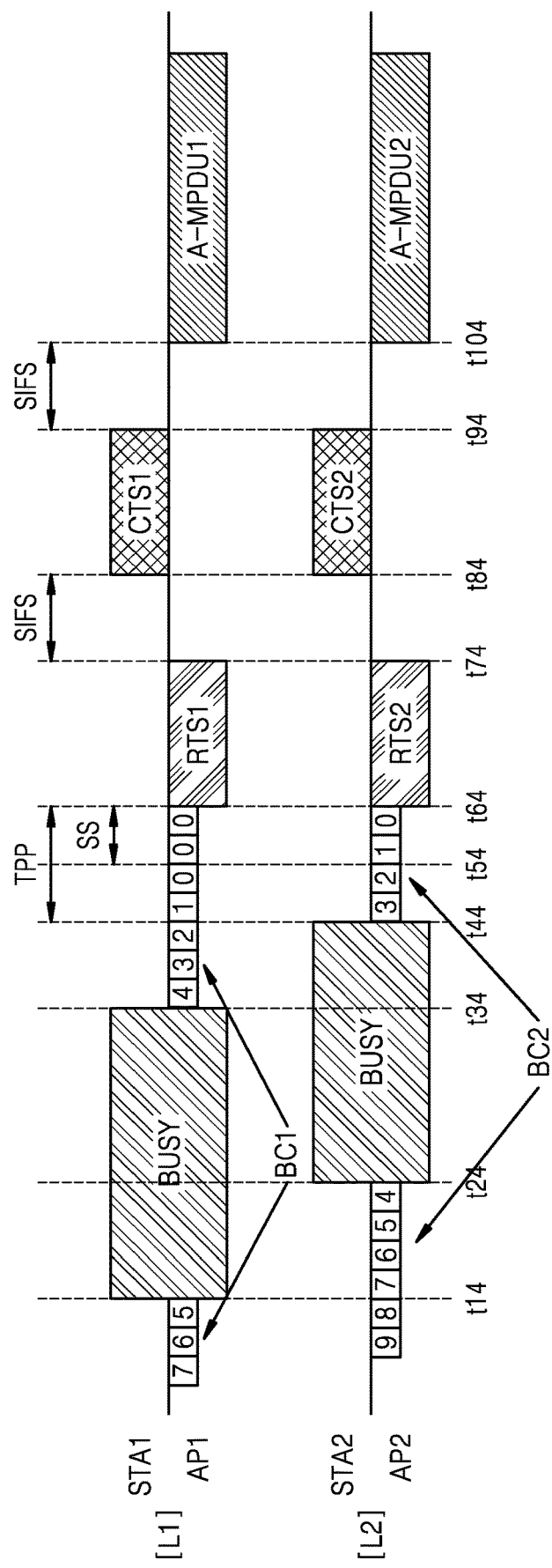
FIG. 7 is a timing diagram of an example of a multiple-links operation, according to an embodiment.

FIG. 7 is a timing diagram of an example of an MLO according to an embodiment.

Referring to FIG. 7, a back-off count BC1 of the first AP AP1 corresponding to the first link L1 may decrease while the first link L1 is not busy, and a back-off count BC2 of the second AP AP2 corresponding to the second link L2 may decrease while the second link L2 is not busy. At time t14, the first link L1 may enter a busy state according to other transmissions, and the back-off count BC1 of the first AP AP1 may stop decreasing. Similarly, at time t24, the second link L2 may enter a busy state according to other transmissions, and the back-off count BC2 of the second AP AP2 may stop decreasing.

At time t34, the busy state of the first link L1 may be released, and thus, the back-off count BC1 of the first AP AP1 may gradually decrease from 4, for example. In some embodiments, the release of the busy state may be referred to as a ready state (or an idle state). Similarly, at time t44, the busy state of the second link L2 may be released, and thus, the back-off count BC2 of the second AP AP2 may gradually decrease from 3, for example. Also, at time t44, the first AP AP1 may enter a transmission preparation period TPP of the first RTS frame RTS1, in response to the back-off count BC1 reaching 1, for example. However, this is merely an example, and one or more embodiments are not limited thereto. The first AP AP1 may enter the transmission preparation period TPP of the first RTS frame RTS1, in response to the back-off count BC1 reaching another arbitrary reference value.

In the transmission preparation period TPP, the first AP AP1 may obtain transmission-related information of the second RTS frame RTS2 of the second AP AP2. In detail, the first AP AP1 may obtain the back-off count BC2 of the second AP AP2. In this case, the first AP AP1 may identify that a difference between the back-off count BC1 of the first AP AP1 (e.g., 1) in the time t44 and the back-off count BC2 of the second AP AP2 (e.g., 3) is included in a reference difference and may determine the second RTS frame RTS2 to be an alignment target RTS frame. In the transmission preparation period TPP, the first AP AP1 may set a standby space SS from a time t54 to a time t64, based on the difference between the back-off count BC1 of the first AP AP1 (e.g., 1) in the time t44 and the back-off count BC2 of the second AP AP2 (e.g., 3) and may delay the transmission of the first RTS frame RTS1 by as much as the standby space SS. In an embodiment, a unit length of the standby space SS may correspond to a unit length of a back-off count.

In the time t64, because the back-off count BC2 of the second AP AP2 reaches 0, the second AP AP2 may transmit the second RTS frame RTS2 to the second STA STA2 through the second link L2, and the first AP AP1 may end the transmission preparation period TPP and transmit the first RTS frame RTS1 to the first STA STA1 through the first link L1.

When the first STA STA1 senses the first link L1 and identifies that the first link L1 is in a ready state, the first STA STA1 may transmit the first CTS frame CTS1 to the first AP AP1 through the first link L1 at time t94 after SIFS from the time t84. When the second STA STA2 senses the second link L2 and identifies that the second link L2 is in a ready state, the second STA STA2 may transmit the second CTS frame CTS2 to the second AP AP2 through the second link L2 in the time t94 after the SIFS from the time t84. Accordingly, the first CTS frame CTS1 and the second CTS frame CTS2 may be aligned with each other. In some embodiments, an operation of sensing the first link L1 by the first STA STA1 and an operation of sensing the second link L2 by the second STA2 may be performed between a time t74 and a time t84. In the disclosure, an operation of sensing a link may be referred to as a link sensing operation.

At time t104 after the SIFS from the time t94, the first AP AP1 may transmit the first A-MPDU A-MPDU1 to the first STA STA1 through the first link L1, and the second AP AP2 may transmit the second A-MPDU A-MPDU2 to the second STA STA2 through the second link L2.

Figure 8A:
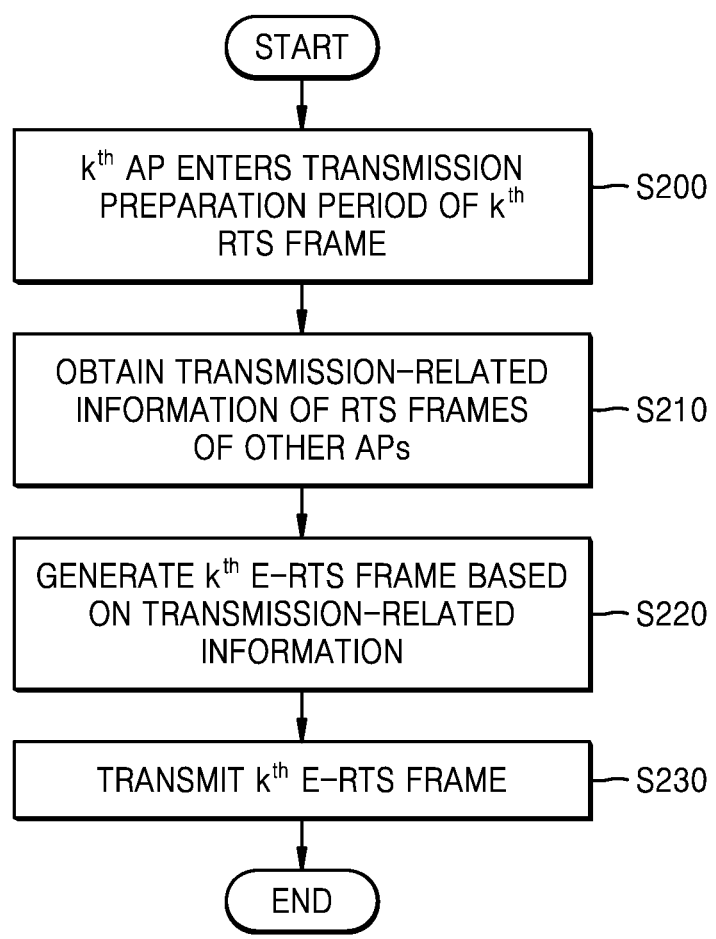
FIGS. 8A and 8B are flowcharts of an operation method of an AP MLD, according to an embodiment.
Figure 8B:
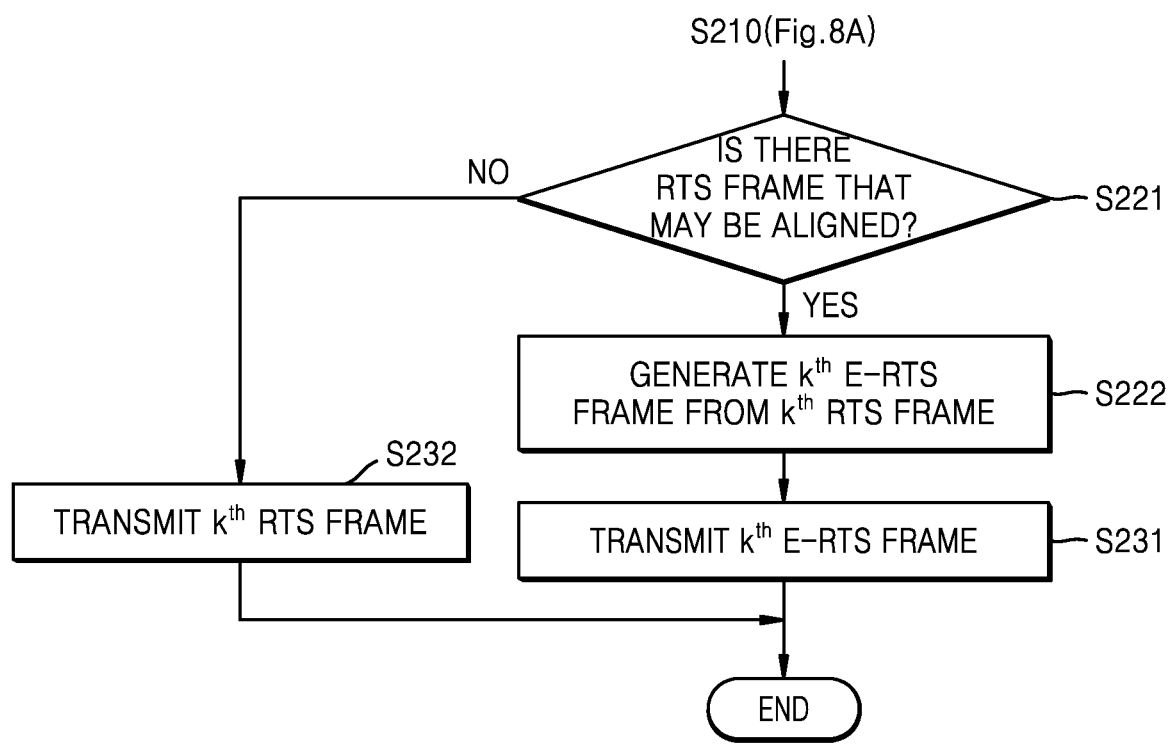

FIGS. 8A and 8B are flowcharts of an operation method of an AP MLD (e.g., AP MLD 100 of FIG. 2, AP MLD 300 of FIG. 3), according to an embodiment. It is assumed that the $k^{th}$ AP and other APs described below are included in the AP MLD. Also, hereinafter, a case where an RTS frame is transmitted from the AP MLD to a non-AP MLD is mainly described, but one or more embodiments are not limited thereto. It is to be fully understood that the disclosure may also be applied to a case where an RTS frame is transmitted from the non-AP MLD to the AP MLD without departing from the scope of the disclosure. Hereinafter, the descriptions already provided with reference to FIGS. 6A and 6B are omitted.

Referring to FIG. 8A, in operation S200, the $k^{th}$ AP may enter the transmission preparation period of the $k^{th}$ RTS frame of the $k^{th}$ AP.

In operation S210, the $k^{th}$ AP may obtain transmission-related information of RTS frames of other APs except for the $k^{th}$ AP. It may be limited that other APs correspond to links having a non-STR link pair relationship with the $k^{th}$ link corresponding to the $k^{th}$ AP.

In operation S220, the $k^{th}$ AP may generate a $k^{th}$ extended RTS (E-RTS) frame based on the information obtained in operation S210. In an embodiment, the $k^{th}$ AP may determine an additional length of the $k^{th}$ RTS frame based on a transmission timing of the RTS frame of another AP and may add, to the $k^{th}$ RTS frame, padding data corresponding to the additional length, thereby generating the $k^{th}$ E-RTS frame.

In operation S230, the $k^{th}$ AP may transmit the $k^{th}$ E-RTS frame after the transmission preparation ends. Then, another AP may transmit an RTS frame, and an end of the $k^{th}$ E-RTS frame transmitted from the $k^{th}$ AP may be aligned with an end of the RTS frame transmitted from the other AP.

FIG. 8B is a flowchart illustrating in detail operations S220 and S230 of FIG. 8A. Referring further to FIG. 8B, in operation S221 after operation S210 (FIG. 8A), the $k^{th}$ AP may identify whether there is an RTS frame that may be aligned with the $k^{th}$ RTS frame. In this case, the RTS frame, which may be aligned with the $k^{th}$ RTS frame, may indicate an RTS frame scheduled to be transmitted to have an end that may be aligned with the end of the $k^{th}$ RTS frame.

When a result from operation S221 is 'YES,' operation S222 may be subsequently performed, and the $k^{th}$ AP may generate the $k^{th}$ E-RTS frame from the $k^{th}$ RTS frame. In detail, the $k^{th}$ AP may determine an additional length based on a difference between a transmission timing of the alignment target RTS frame of the identified AP and the transmission timing of the $k^{th}$ RTS frame of the $k^{th}$ AP, generate padding data corresponding to the additional length, and add the padding data to the $k^{th}$ RTS frame, thus generating the $k^{th}$ E-RTS frame. In some embodiments, in operation S221, it may be identified that there are a plurality of RTS frames that may be aligned with the $k^{th}$ RTS frame, and in this case, APs including the $k^{th}$ AP may add the padding data respectively to the $k^{th}$ RTS frame and the alignment target RTS frames, based on the latest transmission timing of the RTS frame, and may generate the $k^{th}$ E-RTS frame and alignment target E-RTS frames.

In operation S231, the $k^{th}$ AP may transmit the $k^{th}$ E-RTS frame. The $k^{th}$ E-RTS frame may be greater in length than the alignment target RTS frame.

When the result from operation S221 is 'NO,' operation S232 may be subsequently performed, and the AP MLD may transmit the $k^{th}$ RTS frame. The $k^{th}$ RTS frame may have the same length as the alignment target RTS frame.

Figure 9:
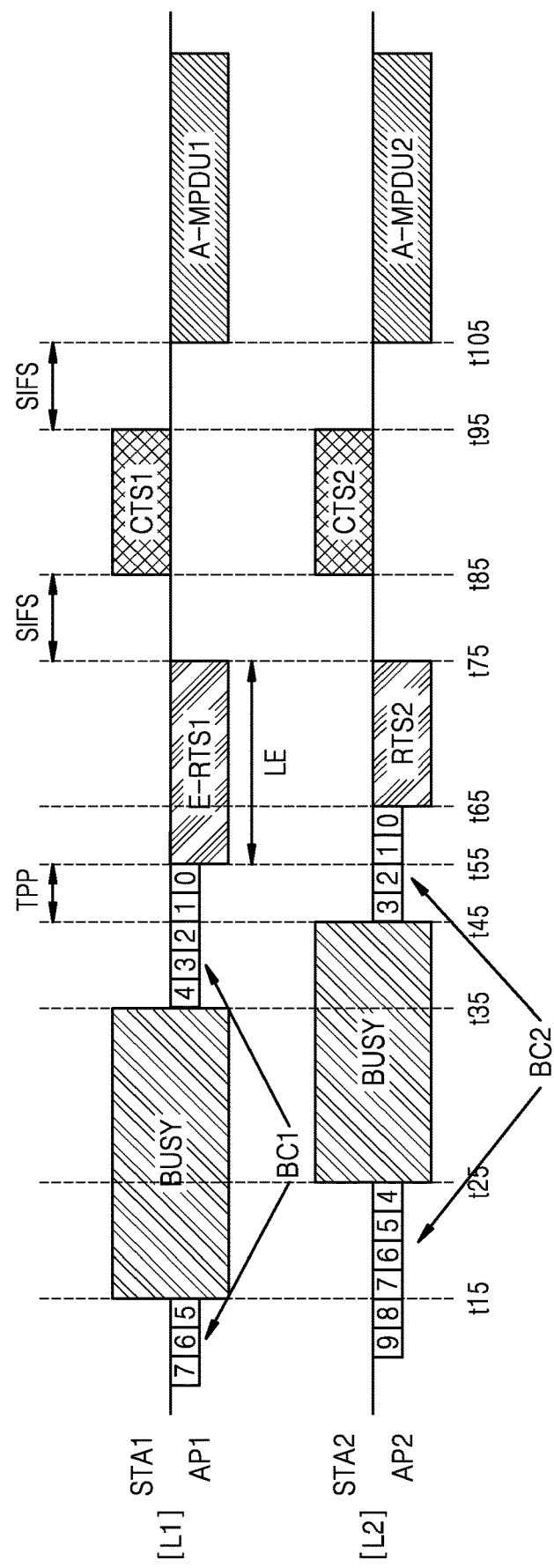
FIG. 9 is a timing diagram of an example of a multiple-links operation, according to an embodiment.

FIG. 9 is a timing diagram of an example of an MLO according to an embodiment. Hereinafter, descriptions that are the same as the descriptions regarding FIG. 7 are omitted.

Referring to FIG. 9, at time t15, the first link L1 may enter a busy state according to other transmissions, and the back-off count BC1 of the first AP AP1 may stop decreasing. Similarly, at time t25, the second link L2 may enter a busy state according to other transmissions, and the back-off count BC2 of the second AP AP2 may stop decreasing.

At time t35, the busy state of the first link L1 may be released, and thus, the back-off count BC1 of the first AP AP1 may gradually decrease from 4, for example. Similarly, at time t45, the busy state of the second link L2 may be released, and thus, the back-off count BC2 of the second AP AP2 may gradually decrease from 3, for example. Also, in the time t45, the first AP AP1 may enter the transmission preparation period TPP of the first RTS frame in response to the back-off count BC1 of the first AP AP1 reaching 1, for example.

In the transmission preparation period TPP, the first AP AP1 may obtain the transmission-related information of the second RTS frame RTS2 of the second AP AP2. In detail, the first AP AP1 may obtain information, which indicates that the protection mechanism is activated in the second link L2 corresponding to the second AP AP2, and the back-off count BC2 of the second AP AP2. In this case, the first AP AP1 may identify that the difference between the back-off count BC1 of the first AP AP1 (e.g., 1) and the back-off count BC2 of the second AP AP2 (e.g., 3) in the time t45 is included in the reference difference and may determine the second RTS frame RTS2 as the alignment target RTS frame. In the transmission preparation period TPP, the first AP AP1 may determine an additional length regarding the first RTS frame, based on the difference between the back-off count BC1 of the first AP AP1 (e.g., 1) and the back-off count BC2 of the second AP AP2 (e.g., 3) in the time t45, and may add padding data corresponding to the additional length to the first RTS frame, thus generating the first E-RTS frame E-RTS1.

In the time T55, because the back-off count BC1 of the first AP AP1 reaches 0, the first AP AP1 may end the transmission preparation period TPP and transmit the first E-RTS frame E-RTS1 to the first STA STA1 through the first link L1.

At time t65, because the back-off count BC2 of the second AP AP2 reaches 0, the second AP AP2 may transmit the second RTS frame RTS2 to the second STA STA2 through the second link L2. The transmission timing of the first E-RTS frame E-RTS1 is different from the transmission timing of the second RTS frame RTS2, but an end of the first E-RTS frame E-RTS1 may be aligned with an end of the second RTS frame RTS2.

When the first STA STA1 senses the first link L1 and identifies that the first link L1 is in a ready state, the first STA STA1 may transmit the first CTS frame CTS1 to the first AP AP1 through the first link L1 in the time t95 after the SIFS from the time t85. When the second STA STA2 senses the second link L2 and identifies that the second link L2 is in a ready state, the second STA STA2 may transmit the second CTS frame CTS2 to the second AP AP2 through the second link L2 in the time t95 after the SIFS from the time t85.

At time t105 after the SIFS from the time t95, the first AP AP1 may transmit the first A-MPDU A-MPDU1 to the first STA STA1 through the first link L1, and the second AP AP2 may transmit the second A-MPDU A-MPDU2 to the second STA STA2 through the second link L2.

Figure 10A:
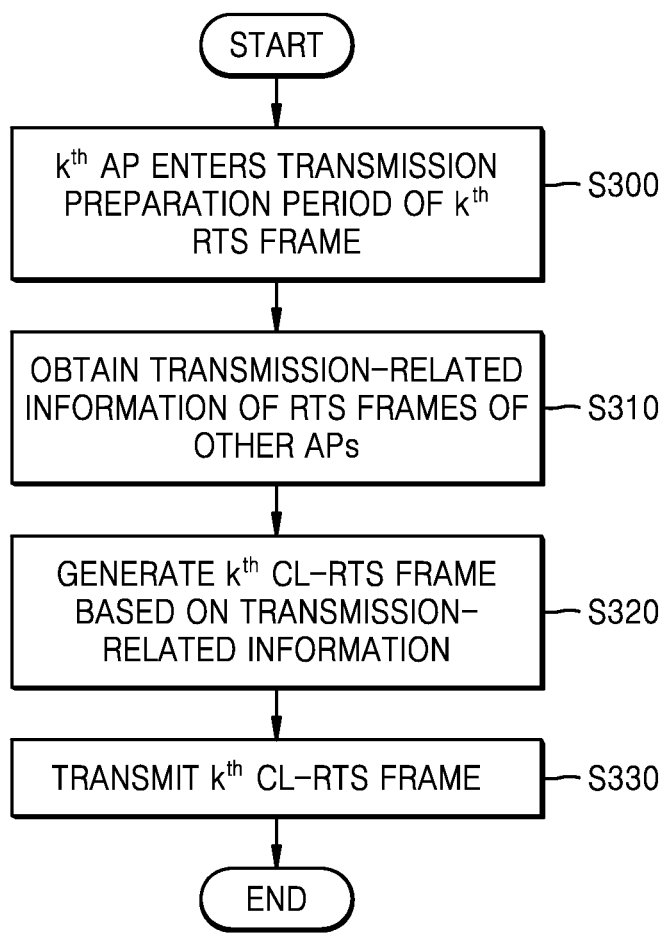
FIGS. 10A and 10B are flowcharts of an operation method of an AP MLD, according to an embodiment.
Figure 10B:
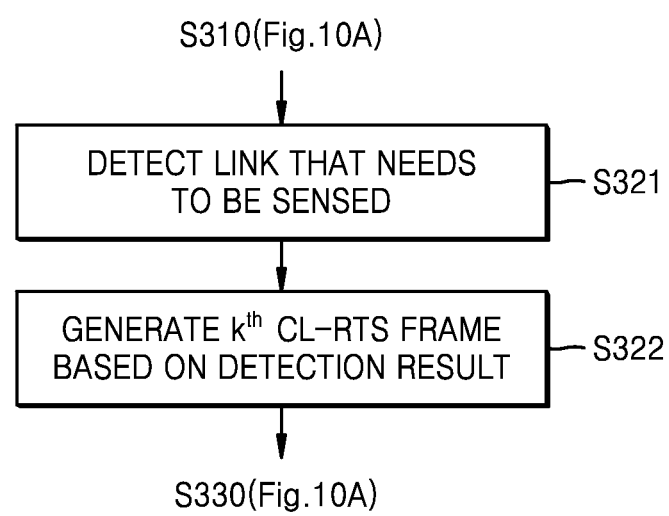

FIGS. 10A and 10B are flowcharts of an operation method of an AP MLD, according to an embodiment. It is assumed that the $k^{th}$ AP and other APs described below are included in the AP MLD. Also, hereinafter, a case where the RTS frame is transmitted from the AP MLD to the non-AP MLD is mainly described, but one or more embodiments are not limited thereto. It is to be fully understood that the disclosure may be applied to a case where the RTS frame is transmitted from the non-AP MLD to the AP MLD without departing from the scope of the disclosure. Hereinafter, descriptions that are the same as the descriptions regarding FIGS. 6A and 6B are omitted.

Referring to FIG. 10A, in operation S300, the $k^{th}$ AP may enter a transmission preparation period of the $k^{th}$ RTS frame of the $k^{th}$ AP.

In operation S310, the $k^{th}$ AP may obtain transmission-related information of RTS frames of other APs except for the $k^{th}$ AP. It may be limited that other APs correspond to links having a non-STR link pair relationship with a $k^{th}$ link corresponding to the $k^{th}$ AP.

In operation S320, the $k^{th}$ AP may generate a $k^{th}$ cross link-RTS (CL-RTS) frame based on the information obtained in operation S310. In an embodiment, the $k^{th}$ AP may determine cross-link-related information of the $k^{th}$ RTS frame based on a transmission timing of the RTS frame of another AP and may generate the $k^{th}$ CL-RTS frame by filling data matching cross-link-related information determined with regard to some subfields of the $k^{th}$ RTS frame. In an embodiment, the cross-link-related information may include at least one of link indices indicating links, information used to indicate whether each link needs to be sensed, and information regarding resources assigned for the transmission of a CTS frame of each link.

In operation S330, the $k^{th}$ AP may end the transmission preparation period and transmit the $k^{th}$ CL-RTS frame. The transmission of the $k^{th}$ CL-RTS frame may replace the transmission of the RTS frame of another AP, and thus, the transmission of the RTS frame of the other AP may be omitted.

FIG. 10B is a flowchart illustrating operation S320 of FIG. 10A in detail. Referring further to FIG. 10B, in operation S321 performed after operation S310 (FIG. 10A), the $k^{th}$ AP may detect a link that needs to be sensed from among links except for the $k^{th}$ link corresponding to the $k^{th}$ AP. In the disclosure, sensing of a link may denote an operation of sensing whether the link is in a busy state. In an embodiment, the $k^{th}$ AP may detect a link through which transmission of an RTS frame is scheduled, the RTS frame having a transmission timing close to the transmission timing of the $k^{th}$ RTS frame.

In operation S322, the $k^{th}$ AP may generate the $k^{th}$ CL-RTS frame based on a result of the detection obtained in operation S321. For example, the $k^{th}$ CL-RTS frame may be generated by filling, in some of the subfields of the $k^{th}$ RTS frame, information indicating that link sensing is required for a link index corresponding to the detected link and information regarding resources assigned for the transmission of the CTS frame. Then, operation S330 (FIG. 10A) may be subsequently performed.

FIG. 11 is a table diagram describing cross-link-related information INFO according to an embodiment.

Referring to FIG. 11, the cross-link-related information INFO may include 'Link Index' indicating each link, 'Link Sensing Required' indicating whether each link needs to be sensed, and 'RU Allocation' indicating resources assigned to transmit a CTS frame of each link. The cross-link-related information INFO may further include information required to transmit a CTS frame of an AP (e.g., the AP detected in operation S321 of FIG. 10B) that does not directly receive an RTS frame through a link assigned to the AP, and there may be a 'Reserved' space to enable such information to be arranged later. The format of the RTS frame may further include subfields related to cross-links in which the cross-link-related information INFO is filled.

Figure 12:
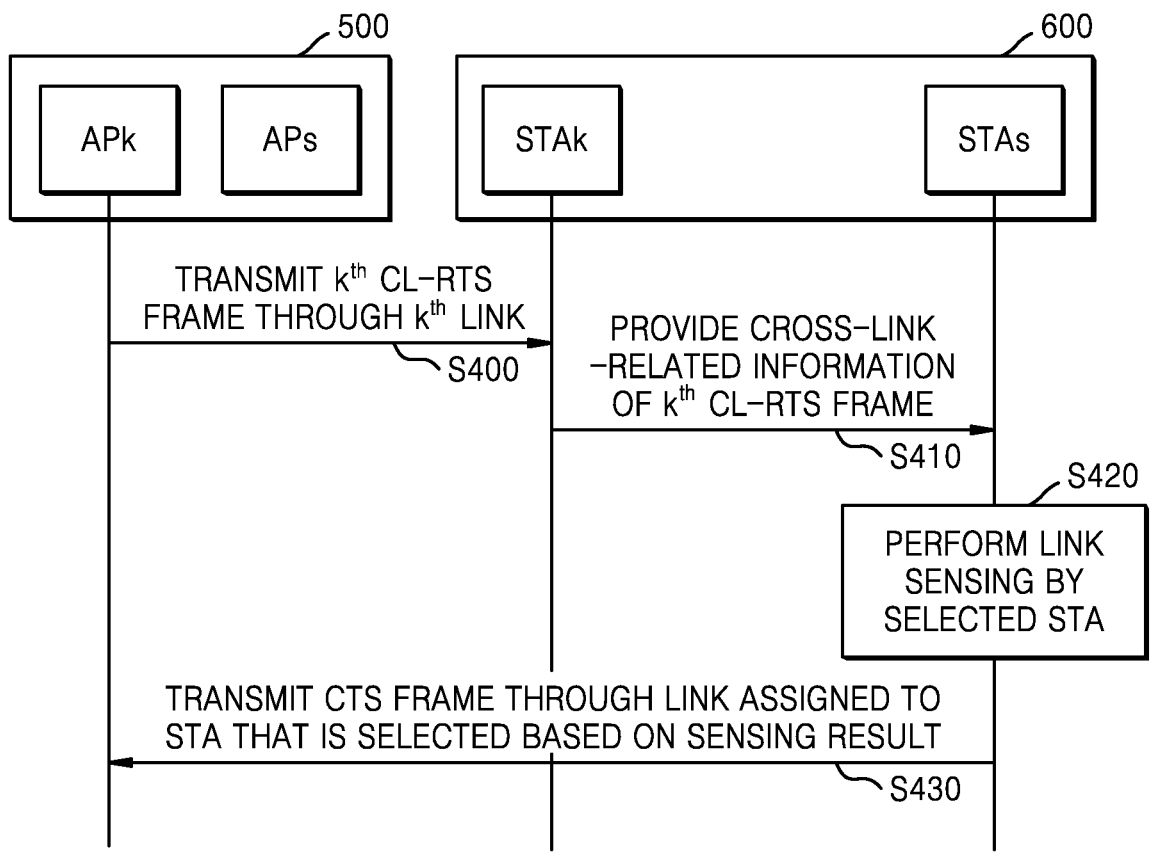
FIG. 12 is a flowchart of an operation method of an AP MLD and a non-AP MLD, according to an embodiment.

FIG. 12 is a flowchart of an operation method of an AP MLD 500 and a non-AP MLD 600, according to an embodiment. In detail, the AP MLD 500 may include a $k^{th}$ AP APk and other APs, and the non-AP MLD 600 may include a $k^{th}$ STA STAk and other STAs communicating with the $k^{th}$ AP APk through a $k^{th}$ link. The AP MLD 500 may include or may be similar in many respects to at least one of the AP MLD 300 of FIG. 3, the AP MLD 100 of FIG. 2 and the first device D1_1 and the second device D1_2 of FIG. 1, and may include additional features not mentioned above. The non-AP MLD 600 may include or may be similar in many respects to at least one of the non-AP MLD 400 of FIG. 3, the non-AP MLD 200 of FIG. 2, and the third to sixth devices (e.g., D2_1, D2_2, D2_3, D2_4) of FIG. 1, and may include additional features not mentioned above.

Hereinafter, a case where an RTS frame is transmitted from the AL MLD 500 to the non-AP MLD 600 is mainly described, but one or more embodiments are not limited thereto. It is to be fully understood that the disclosure may be applied to a case where the RTS frame is transmitted from the non-AP MLD 600 to the AP MLD 500 without departing from the scope of the disclosure.

Referring to FIG. 12, in operation S400, the $k^{th}$ AP APk may transmit a $k^{th}$ CL-RTS frame through the $k^{th}$ link. As described above, the $k^{th}$ CL-RTS frame may indicate a link that needs to be sensed in response to the $k^{th}$ CL-RTS frame from among other links APs and indicate resources for the transmission of the CTS frame. The AP MLD 500 may omit the transmission of the RTS frame through a link that is in a cross-link relationship with the $k^{th}$ link. In the disclosure, when the second link is sensed based on the CL-RTS frame transmitted through the first link, the first link and the second link may be referred to as being in a mutual cross-link relationship. That is, because the $k^{th}$ CL-RTS frame is used to sense a link having a cross-link relationship with the $k^{th}$ link, the transmission of the RTS frame through the link may be omitted.

In operation S410, the non-AP MLD 600 may provide other STAs with cross-link-related information of the $k^{th}$ CL-RTS frame.

In operation S420, an STA selected from among the other STAs may perform link sensing based on the cross-link-related information. The selected STA may be an STA corresponding to a link requiring the sensing in the cross-link-related information. In the disclosure, an operation of a certain STA may be interpreted as an operation of the non-AP MLD.

The STA selected in operation S430 may transmit the CTS frame to an AP corresponding to the selected STA from among the other APs, through a link assigned to the STA selected based on the sensing result obtained in operation S420. The $k^{th}$ STA STAk may sense the $k^{th}$ link in response to the $k^{th}$ CL-RTS frame and transmit the $k^{th}$ CTS frame to the $k^{th}$ AP APk through the $k^{th}$ link based on the sensing result.

Figure 13A:
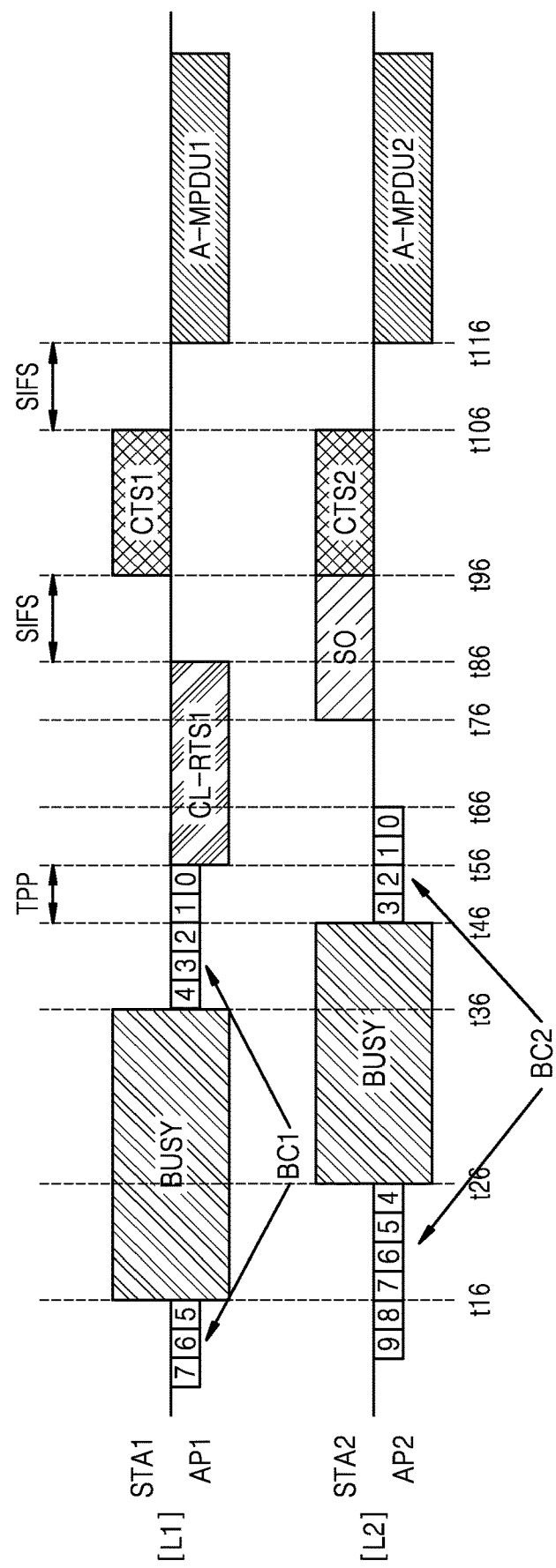
FIGS. 13A and 13B are timing diagrams of an example of a multiple-links operation, according to an embodiment.
Figure 13B:
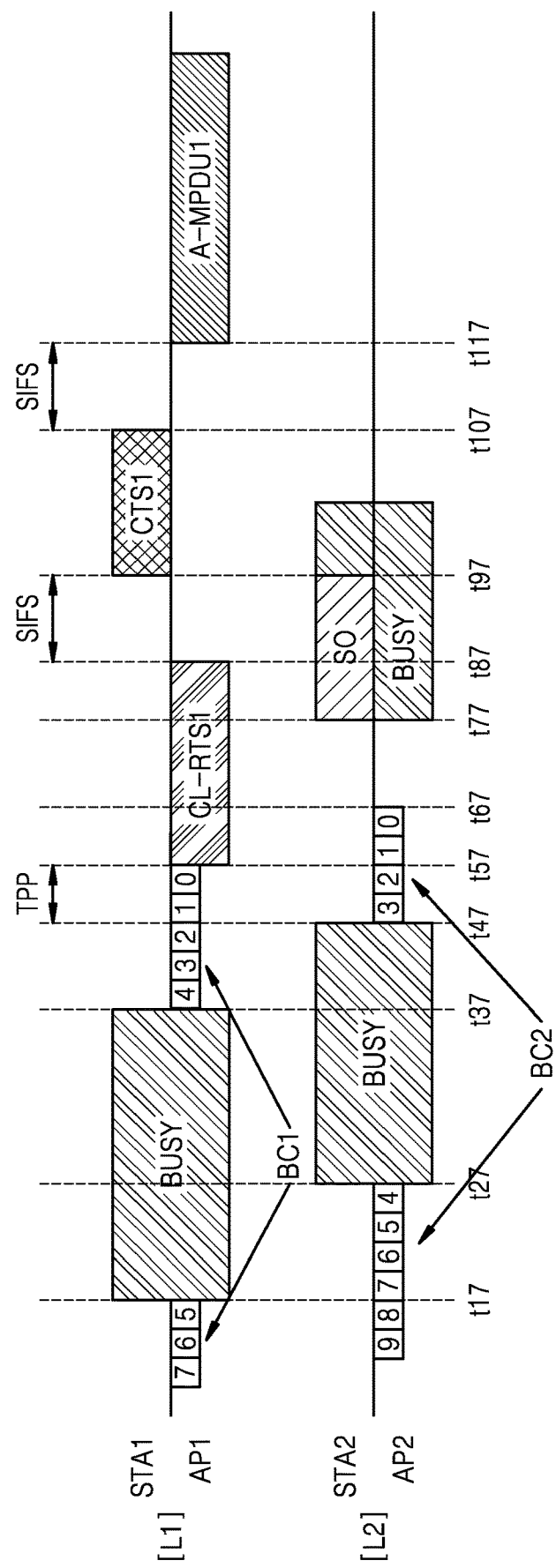

FIGS. 13A and 13B are timing diagrams of an example of an MLO according to an embodiment. Hereinafter, descriptions that are the same as the descriptions regarding FIG. 7 are omitted.

Referring to FIG. 13A, at time t16, the first link L1 may enter a busy state according to other transmissions, and the back-off count BC1 of the first AP AP1 may stop decreasing. Similarly, at time t26, the second link L2 may enter a busy state according to other transmissions, and the back-off count BC2 of the second AP AP2 may stop decreasing.

At time t36, the busy state of the first link L1 may be released, and thus, the back-off count BC1 of the first AP AP1 may gradually decrease from 4, for example. Similarly, at time t45, the busy state of the second link L2 may be released, and thus, the back-off count BC2 of the second AP AP2 may gradually decrease from 3, for example. Also, at time t46, the first AP AP1 may enter the transmission preparation period TPP of the first RTS frame in response to the back-off count BC1 reaching 1.

In the transmission preparation period TPP, the first AP AP1 may obtain transmission-related information of the second RTS frame RTS2 of the second AP AP2. In detail, the first AP AP1 may obtain the back-off count BC2 of the second AP AP2. In this case, the first AP AP1 may identify that the difference between the back-off count BC1 of the first AP AP1 (e.g., 1) and the back-off count BC2 of the second AP AP2 (e.g., 3) in the time t46 is included in the reference difference and may detect the second link L2 as a link requiring the sensing. In the transmission preparation period TPP, the first AP AP1 may determine cross-link-related information based on a detection result. In detail, the AP MLD may indicate that the second link L2 needs to be sensed and determine the cross-link-related information to indicate a resource assigned for the transmission of the second CTS frame CTS2 through the second link L2. In the transmission preparation period TPP, the first AP AP1 may fill data matching the determined cross-link-related information in some of the sub-fields of the first RTS frame and thus may generate the first CL-RTS frame CL-RTS1.

At time t56, because the back-off count BC1 of the first AP AP1 reaches 0, the first AP AP1 may end the transmission preparation period TPP and transmit the first CL-RTS frame CL-RTS1 to the first STA STA1 through the first link L1.

At time t66, the back-off count BC2 of the second AP AP2 may reach 0, and the transmission of the second RTS frame of the second AP AP2 may be omitted.

At time t76 to time t96, the second STA STA2 may receive cross-link-related information included in the first CL-RTS frame CL-RTS1 and perform a sensing operation SO regarding the second link L2 based on the cross-link-related information. The second STA STA2 may identify that the second link L2 is in a ready state by performing the sensing operation SO. A performance timing and a performance time of the sensing operation SO of FIG. 13A are merely examples, and one or more embodiments are not limited thereto. The sensing operation SO may be performed on the second link L2 at appropriate timing and time so that the first CTS frame CTS1 and the second CTS frame CTS2 may be aligned.

When the first STA STA1 senses the first link L1 and identifies that the first link L1 is in a ready state, the first STA STA1 may transmit the first CTS frame CTS1 to the first AP AP1 through the first link L1 at time t96 after the SIFS from the time t86. When the second STA STA2 senses the second link L2 and identifies that the second link L2 is in a ready state, the second STA STA2 may transmit the second CTS frame CTS2 to the second AP AP2 through the second link L2 in the time t96 after the SIFS from the time t86.

At time t116 after the SIFS from time t106, the first AP AP1 may transmit the first A-MPDU A-MPDU1 to the first STA STA1 through the first link L1, and the second AP AP2 may transmit the second A-MPDU A-MPDU2 through the second link L2.

In FIG. 13B, an operation from the times t17 to t77 may be identical to an operation from the times t16 to t66, and thus, an operation after the time t77, which is different from the operation of FIG. 13A, is mainly described.

Referring further to FIG. 13B, at time t77 to time t97, the second STA STA2 may receive the cross-link-related information included in the first CL-RTS CL-RTS1 and perform the sensing operation SO on the second link L2 based on the cross-link-related information. The second STA STA2 may identify that the second link L2 is in the busy state by performing the sensing operation SO.

When the first STA STA1 senses the first link L1 and the first link L1 is in the ready state, the first STA STA1 may transmit the first CTS frame CTS1 to the first AP AP1 through the first link L1 in the time t97 after the SIFS from the time t87. When the second STA STA2 senses the second link L2 and identifies that the second link L2 is in the busy state, the second STA STA2 may not transmit the second CTS frame.

At time t117 after the SIFS from a time t107, the first AP AP1 may transmit the first A-MPDU A-MPDU1 to the first STA STA1 through the first link L1.

Figure 14:
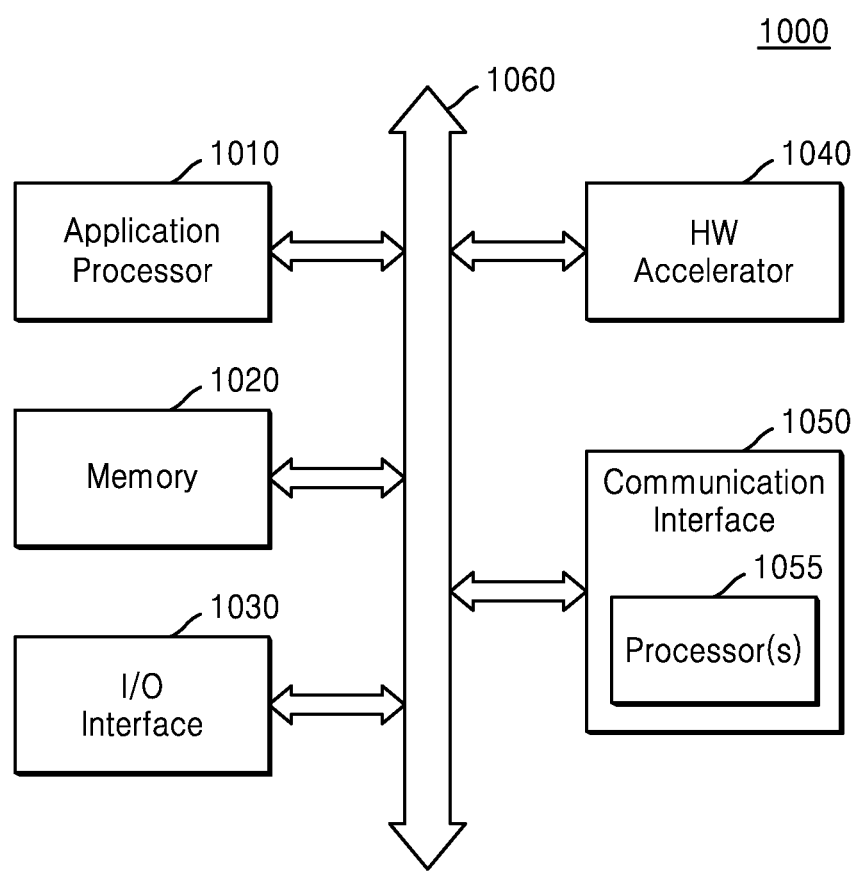
FIG. 14 is a block diagram of a system, according to an embodiment.

FIG. 14 is a block diagram of a system 1000 according to an embodiment. In some embodiments, the system 1000 of FIG. 14 may be realized as at least one chip, and the system 1000 realized as one chip may be referred to as a system-on-chip.

Referring to FIG. 14, the system 1000 may include an application processor 1010, a memory 1020, an input/output interface 1030, a hardware accelerator 1040, and a communication interface 1050, and the application processor 1010, the memory 1020, the input/output interface 1030, the hardware accelerator 1040, and the communication interface 1050 may mutually communicate with each other through a bus 1060.

The application processor 1010 may control the system 1000. For example, the application processor 1010 may include at least one core, and each of the at least one core may execute a series of instructions stored in the memory 1020. In some embodiments, the application processor 1010 may execute an operating system (OS) and applications on the OS. The application processor 1010 may control other components of the system 1000. For example, the application processor 1010 may instruct the hardware accelerator 1040 to perform jobs by providing data thereto, and may obtain results of the jobs performed by the hardware accelerator 1040. Also, the application processor 1010 may provide data, which is to be externally transmitted, to the communication interface 1050 and instruct the communication interface 1050 to transmit the data, and may obtain data received from the outside through the communication interface 1050.

The memory 1020 may be accessed by other components through the bus 1060. The memory 1020 may have an arbitrary structure in which data may be stored, and may include volatile memory such as static random access memory (SRAM) or dynamic random access memory (DRAM) and/or non-volatile memory such as flash memory or resistive random access memory (RRAM). The memory 1020 may store instructions executed by the application processor 1010 or may store data that is read or written by other components.

The input/output interface 1030 may provide an interface regarding inputs to the system 1000 and outputs therefrom. For example, the input/output interface 1030 may communicate with an input/output device included in a product together with the system 1000 and may receive an input from a user or provide an output to the user through the input/output device. Also, the input/output interface 1030 may communicate with peripherals included in the product together with the system 1000 and may enable the application processor 1010 to control the peripherals.

The hardware accelerator 1040 may be hardware designed to perform functions at high speed. For example, the hardware accelerator 1040 may be designed to perform encoding and decoding of data at high speed. Also, the hardware accelerator 1040 may be designed to perform neural processing at high speed. The hardware accelerator 1040 may process data stored in the memory 1020 and store the processed data in the memory 1020.

The communication interface 1050 may provide a communication channel used to communicate with an external subject of the system 1000. For example, the communication interface 1050 may provide a wired communication channel and/or a wireless communication channel. In some embodiments, the communication interface 1050 may perform at least one operation included in a wireless communication method using the multiple links described with reference to the attached drawings. For example, the communication interface 1050 may include at least one processor 1055, and the at least one processor 1055 may execute instructions and thus may perform at least one operation included in the wireless communication method using the multiple links. In some embodiments, the at least one processor 1055 may execute instructions stored in the memory 1020 or a memory included in the communication interface 1050. In some embodiments, the memory 1020 or the memory included in the communication interface 1050 may store information collected with regard to links and may be accessed by the at least one processor 1055.

Figure 15:
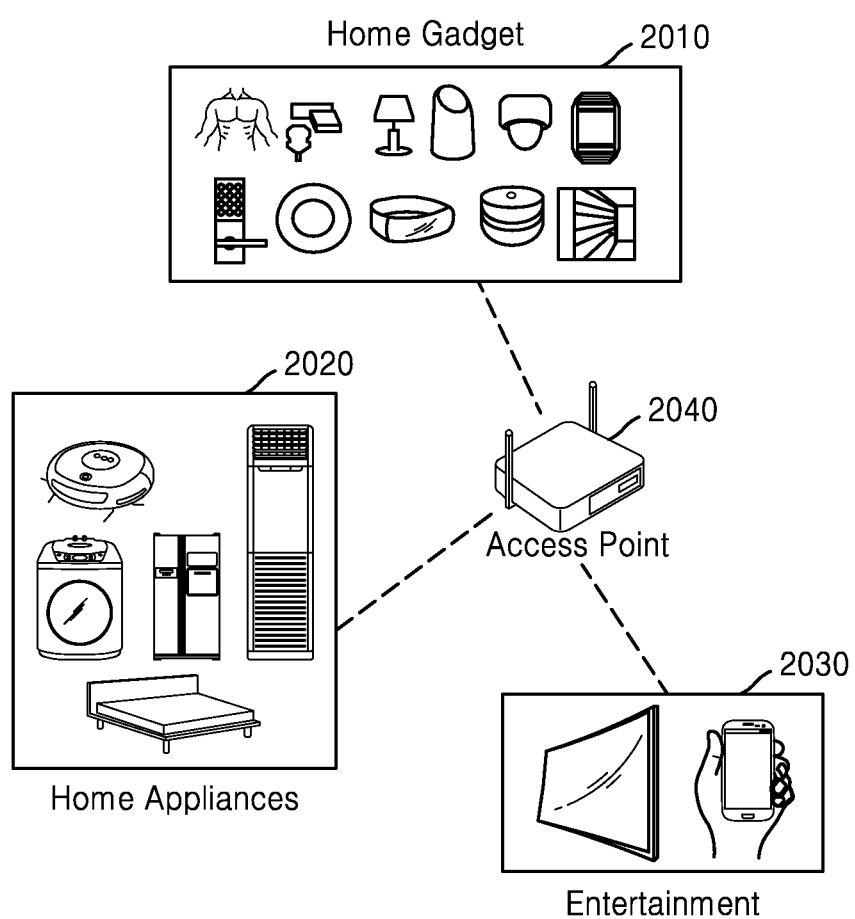
FIG. 15 is a diagram of examples of a device for wireless communication, according to an embodiment.

FIG. 15 is a diagram illustrating examples of a device for mobile communication, according to an embodiment. In detail, FIG. 15 illustrates home gadgets 2010, home appliances 2020, entertainment devices 2030, and an Internet of Things (IoT) network system including an access point 2040.

In some embodiments, in the devices for wireless communication of FIG. 15, as described above with reference to the drawings, an operation using the multiple links may be performed. Accordingly, devices for wireless communication may smoothly perform signaling of a protection mechanism by reducing interference between links in receiving/transmitting RTS frames and CTS frames in a mutual protection mechanism by using a multiple links. Accordingly, high reliability of data communication between devices may be secured.

While embodiments of the disclosure has been particularly shown and described, it is to be understood that various changes in form and details may be made therein without departing from the spirit and scope of the following claims.

What is claimed is:

1. A wireless communication method performed by a first device, the wireless communication method comprising:
   entering a transmission preparation period of a first Request To Send (RTS) frame via a first link;
   obtaining transmission-related information of a second RTS frame via a second link;
   determining at least one of a first transmission timing and content of the first RTS frame, based on the transmission-related information of the second RTS frame;
   generating the first RTS frame based on a result of the determining; and
   transmitting, to a second device via the first link, the generated first RTS frame,
   wherein the determining of the content of the first RTS frame comprises:
   identifying a second transmission timing of the second RTS frame based on the transmission-related information of the second RTS frame; and
   determining cross-link-related information of the first RTS frame, based on the second transmission timing of the second RTS frame.

2. The wireless communication method of claim 1, wherein the entering the transmission preparation period of the first RTS frame comprises entering, in response to a back-off count of the first link reaching a reference value, the transmission preparation period of the first RTS frame via the first link.

3. The wireless communication method of claim 1, wherein the transmission-related information of the second RTS frame comprises a back-off count of the second link.

4. The wireless communication method of claim 1, wherein the determining the first transmission timing of the first RTS frame comprises:
   identifying the second transmission timing of the second RTS frame based on the transmission-related information of the second RTS frame; and
   determining the first transmission timing of the first RTS frame to correspond to the second transmission timing of the second RTS frame.

5. The wireless communication method of claim 1, wherein the determining the content of the first RTS frame comprises:
   identifying the second transmission timing of the second RTS frame based on the transmission-related information of the second RTS frame; and
   determining an additional length of the first RTS frame, based on the second transmission timing of the second RTS frame.

6. The wireless communication method of claim 5, wherein the generating the first RTS frame comprises:
   adding padding data to the first RTS frame, the padding data corresponding to the additional length of the first RTS frame.

7. The wireless communication method of claim 5, further comprising:
   adjusting a length of the first RTS frame according to the additional length, resulting in a length-adjusted first RTS frame;
   in response to determining that the transmission preparation period of the first RTS frame has elapsed, transmitting, to the second device via the first link, the length-adjusted first RTS frame; and
   transmitting, to the second device via the second link, the second RTS frame.

8. The wireless communication method of claim 1, wherein the cross-link-related information comprises at least one of a link index indicating the second link, information indicating whether link sensing is required for the second link, and resource information regarding a resource assigned for transmission of a Clear To Send (CTS) frame via the second link.

9. The wireless communication method of claim 1, wherein the generating of the first RTS frame comprises:
   filling at least one subfield of the first RTS frame with data matching the cross-link-related information, resulting in a data-filled first RTS frame.

10. The wireless communication method of claim 9, further comprising:
    in response to determining that the transmission preparation period of the first RTS frame has elapsed, transmitting, to the second device via the first link, the data-filled first RTS frame; and
    omitting transmission, to the second device via the second link, of the second RTS frame.

11. The wireless communication method of claim 10, further comprising:
    receiving, from the second device, a first Clear to Send (CTS) frame via the first link and a second CTS frame via the second link, in response to the first RTS frame.

12. A first device configured to communicate with a second device via a first link and a second link, the first device comprising:
    a radio frequency integrated circuit (RFIC) configured to provide a plurality of access points respectively corresponding to the first link and the second link; and
    a processor configured to control the plurality of access points,
    wherein the processor is further configured to:
      during a transmission preparation period of a first Request To Send (RTS) frame through the first link, obtain transmission-related information of a second RTS frame via the second link;
      determine at least one of a first transmission timing and content of the first RTS frame, based on the transmission-related information of the second RTS frame;
      generate the first RTS frame based on a result of the determining; and
      transmit, to the second device via the first link, the generated first RTS frame, and
    wherein the processor is further configured to:
      determine cross-link-related information of the first RTS frame, based on whether a transmission timing of the second RTS frame is within a threshold timing to an entry timing of the first RTS frame in the transmission preparation period within a reference time; and
      fill, in the first RTS frame, data matching the cross-link-related information.

13. The first device of claim 12, wherein the processor is further configured to delay the first transmission timing of the first RTS frame via the first link to enable the first transmission timing of the first RTS frame to correspond to a second transmission timing of the second RTS frame via the second link.

14. The first device of claim 12, wherein the processor is further configured to add, to the first RTS frame, padding data having a variable length changing according to the transmission timing of the second RTS frame via the second link.

15. The first device of claim 12, wherein the processor is further configured to:
control the plurality of access points to transmit, to the second device, the first RTS frame via the first link and the second RTS frame via the second link, the first RTS frame and the second RTS frame having a same length; and
align a first start of the first RTS frame with a second start of the second RTS frame.

16. The first device of claim 12, wherein the processor is further configured to:
control the plurality of access points to transmit, to the second device, the first RTS frame via the first link and the second RTS frame via the second link, the first RTS frame and the second RTS frame having different lengths; and
align a first end of the first RTS frame with a second end of the second RTS frame.

17. The first device of claim 12, wherein the processor is further configured to:
transmit, to the second device via the first link, the first RTS frame comprising the cross-link-related information; and
control the plurality of access points to omit transmission, to the second device via the second link, of the second RTS frame.

18. A wireless communication system comprising:
a plurality of links comprising a first link and a second link;
a first device; and
a second device configured to communicate with the first device via the plurality of links,
wherein the first device is configured to communicate with the second device via the plurality of links,
wherein the first device is further configured to:
determine at least one of a transmission timing and content of a first Request To Send (RTS) frame from among a plurality of RTS frames, based on transmission-related information of the plurality of RTS frames via the plurality of links;
generate the first RTS frame based on a result of the determining; and
transmit, to the second device the generated first RTS frame via the first link, and
wherein the first device is further configured to:
identify a second transmission timing of a second RTS frame from among the plurality of RTS frames, based on transmission-related information of the second RTS frame; and
determine cross-link-related information of the first RTS frame, based on the second transmission timing of the second RTS frame.

* * * * *